United States Patent
Song et al.

[19]

[11] Patent Number: 5,988,670
[45] Date of Patent: Nov. 23, 1999

[54] CHILD CARRIER

[75] Inventors: Zhenghuan Song; Miao Long Ye; Jing Ming Li, all of Kunsan, China

[73] Assignee: Jiangsu Goodbaby Group, Inc., Kunsham, China

[21] Appl. No.: 08/717,121

[22] Filed: Sep. 20, 1996

Related U.S. Application Data

[63] Continuation-in-part of application No. 08/598,771, Feb. 9, 1996, abandoned.

[30] Foreign Application Priority Data

Feb. 15, 1995 [CN] China ................................ 95111534
Mar. 4, 1996 [CN] China ................................ 96205575

[51] Int. Cl.[6] ........................................... B62B 1/00
[52] U.S. Cl. ..................... 280/648; 280/47.4; 280/642; 297/270.2
[58] Field of Search ..................... 280/30, 643, 648, 280/642, 650, 658, 47.38, 47.4; 297/130, 183.3, 183.4, 183.9, 229, 364, 365, 487, 488, 270.2

[56] References Cited

U.S. PATENT DOCUMENTS

| | | |
|---|---|---|
| 2,523,567 | 9/1950 | Grant . |
| 3,330,575 | 7/1967 | Boudreau . |
| 3,411,799 | 11/1968 | Felsher . |
| 3,871,701 | 3/1975 | Gesslein . |
| 4,280,716 | 7/1981 | Vonsbaek et al. . |
| 4,412,689 | 11/1983 | Lee . |
| 4,544,178 | 10/1985 | Al-Sheikh et al. . |
| 4,586,399 | 5/1986 | Kassai . |
| 4,733,882 | 3/1988 | Kassai . |
| 4,736,959 | 4/1988 | Van Steenburg . |
| 4,834,403 | 5/1989 | Yanus et al. . |
| 4,836,573 | 6/1989 | Gebhard ............................ 280/658 X |
| 4,907,818 | 3/1990 | Chai ................................... 280/642 |
| 5,087,066 | 2/1992 | Mong-Hsing ..................... 280/650 X |
| 5,104,134 | 4/1992 | Cone ..................................... 280/30 |
| 5,188,380 | 2/1993 | Tucek .................................... 280/30 |
| 5,201,535 | 4/1993 | Kato et al. . |
| 5,205,577 | 4/1993 | Liu ..................................... 280/642 |
| 5,257,799 | 11/1993 | Cone et al. . |
| 5,454,584 | 10/1995 | Haut et al. . |
| 5,533,936 | 7/1996 | Julien et al. ................... 297/270.2 X |

FOREIGN PATENT DOCUMENTS

| | | |
|---|---|---|
| 86 2 08152 U | 7/1987 | China . |
| 92215144 | 10/1992 | China . |
| 93220881 | 7/1994 | China . |
| 94242511 | 6/1995 | China . |
| 93/01420 | 1/1993 | WIPO . |
| PCT/CN96/ 00015 | 3/1996 | WIPO . |
| 96/2531 A1 | 8/1996 | WIPO . |

OTHER PUBLICATIONS

Advertising material of the Prodigy Shuttle, a trademark of Prodigy Corp., USA.

*Primary Examiner*—Christopher P. Schwartz
*Assistant Examiner*—Pamela J. Lipka
*Attorney, Agent, or Firm*—Lyon & Lyon LLP

[57] ABSTRACT

A child carrier includes a frame, wheels disposed at the lower portion of the frame, a hand-pushed bar joined to the frame, a seat attachable to the frame by a fore swing arm and a rear swing arm. The fore swing arm and the rear swing arm are hinged respectively to the front and rear of the frame and are capable of swinging the seat. The child carrier further includes a switching device that permits a caregiver to adjust the distance between the lower ends of the fore and rear swing arms so that the seat can swing in a horizontal gliding motion or a pendulum type rocking motion. The carrier can also be used as a common hand-pushed carriage when the seat is fixed. The child carrier further includes an anti-swing latch capable of coupling the frame to the fore swing arm to prevent the seat from moving relative to the frame. The seat is adjustable to provide a forward or rearward facing stroller or carriage seat and is removable from the frame to provide a bassinet. The seat includes a seat back, a seat bottom, a foot rest, and an extendible front bar that may be positioned in different positions relative to each other so that the child carrier may be configured in a carriage position or stroller position. The frame is collapsible and movable between an unfolded use position and a folded storage position.

28 Claims, 18 Drawing Sheets

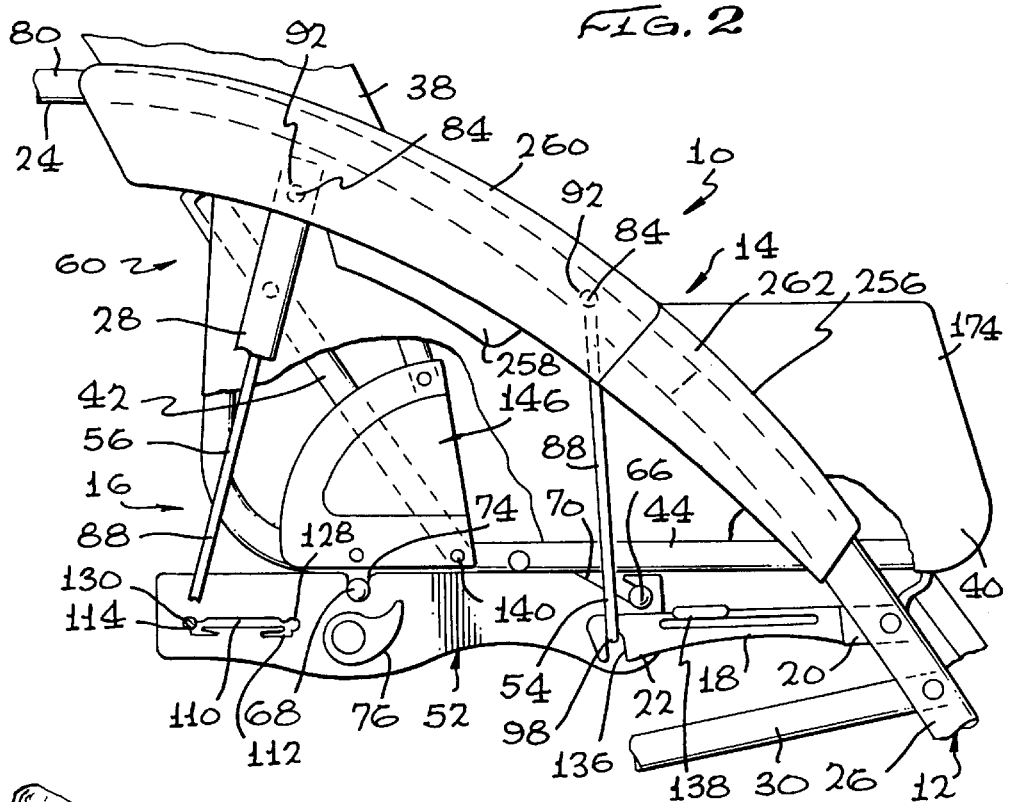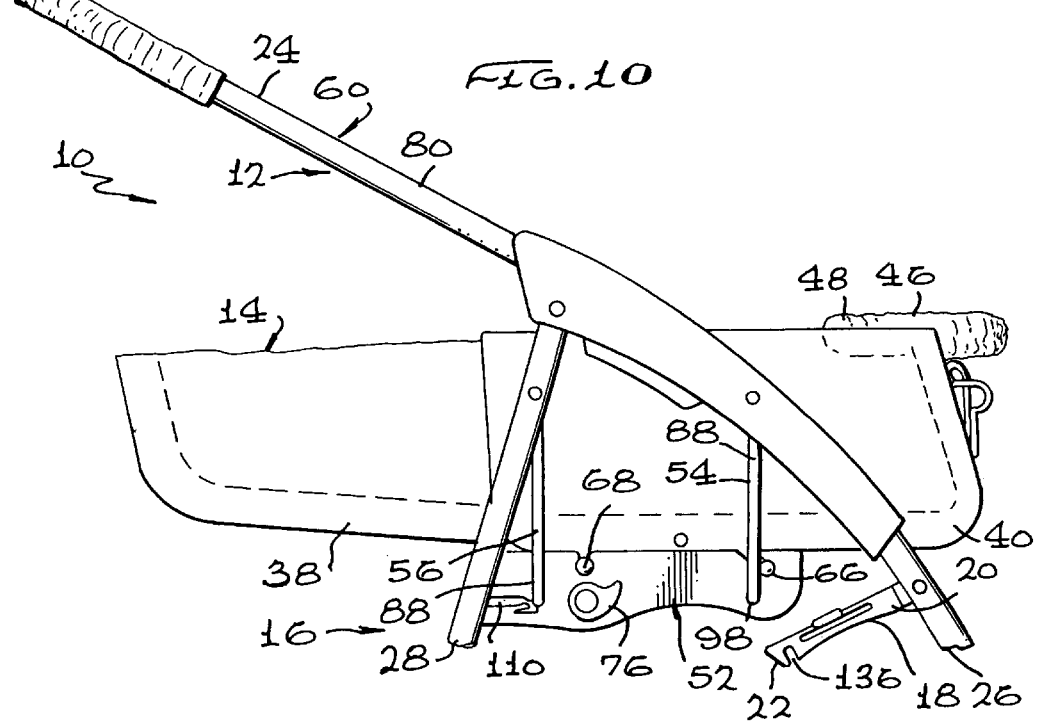

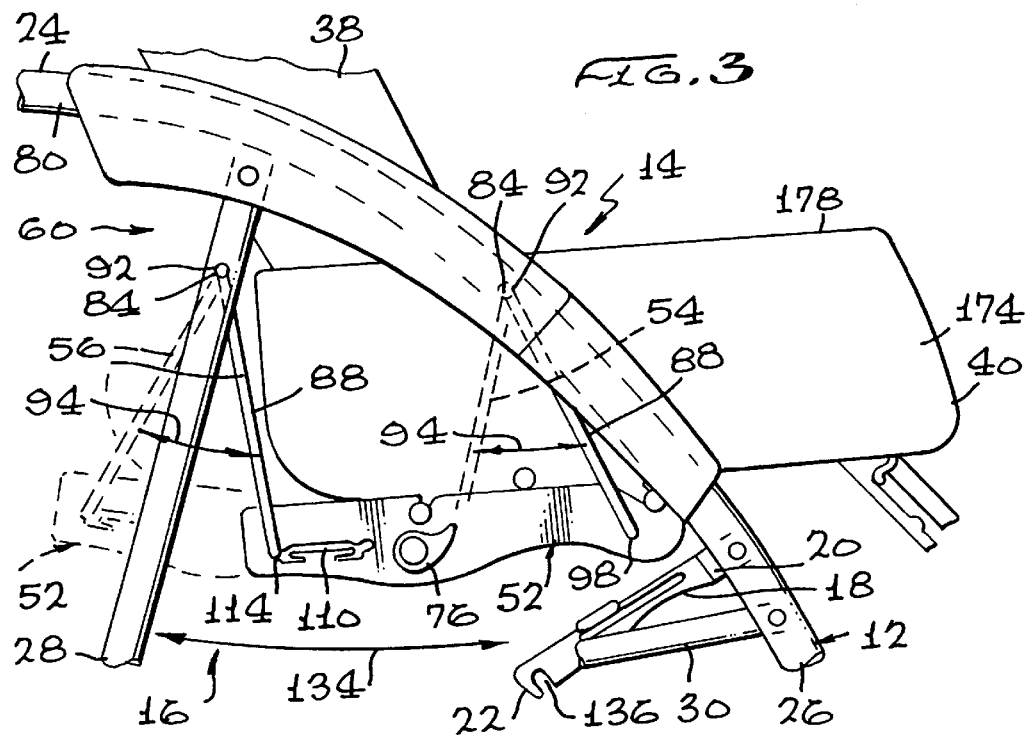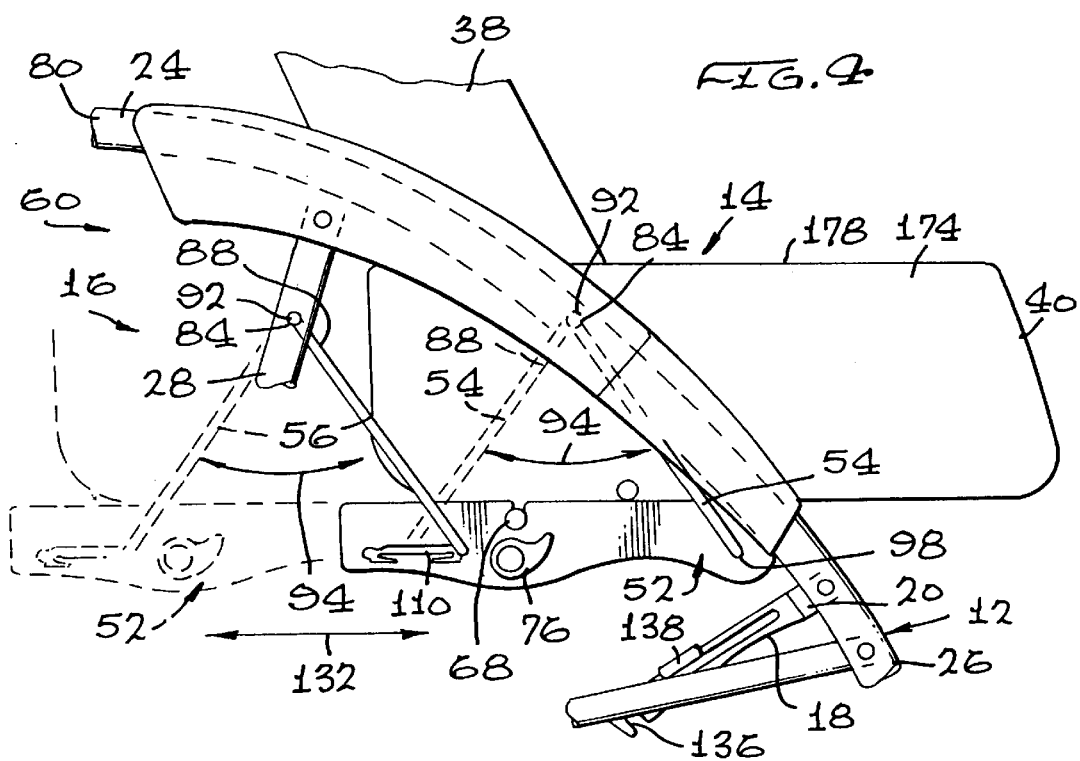

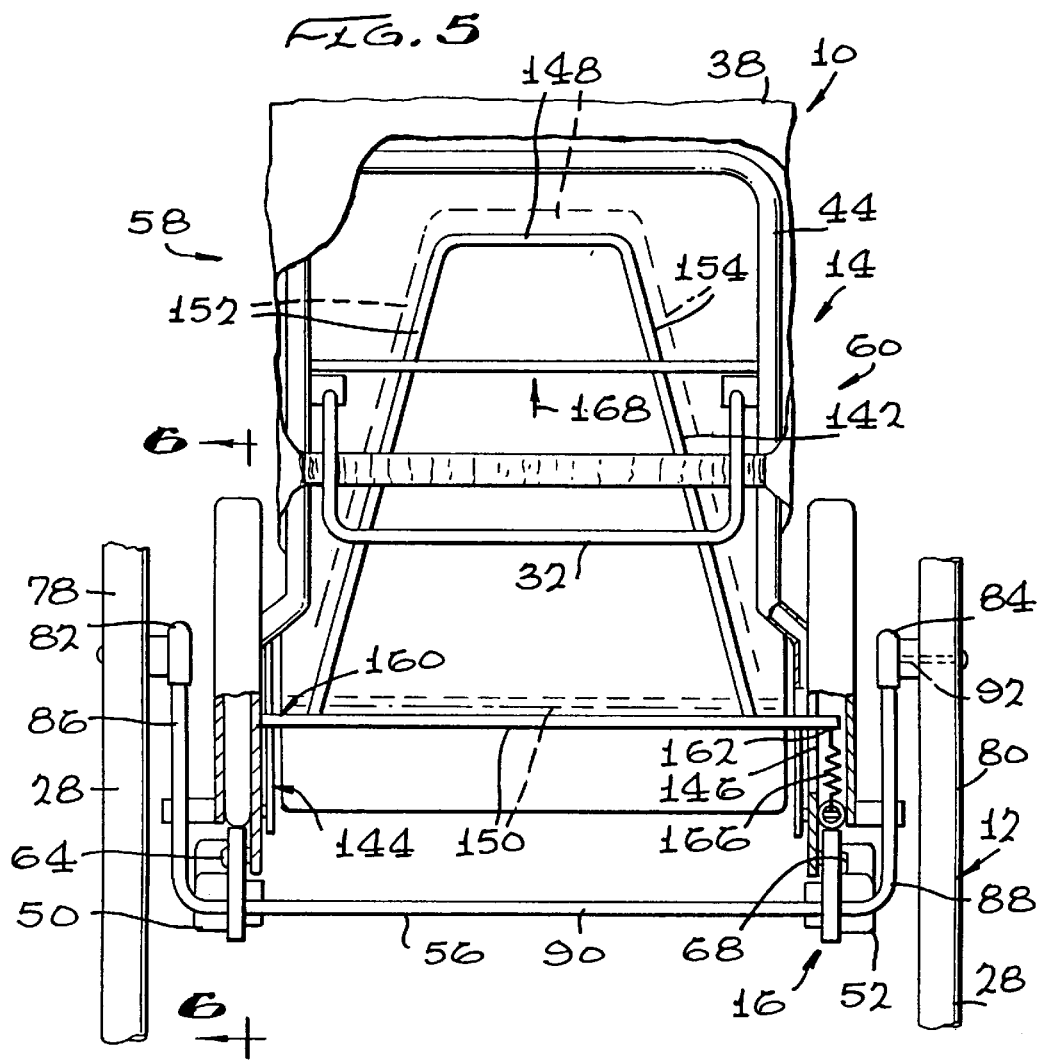
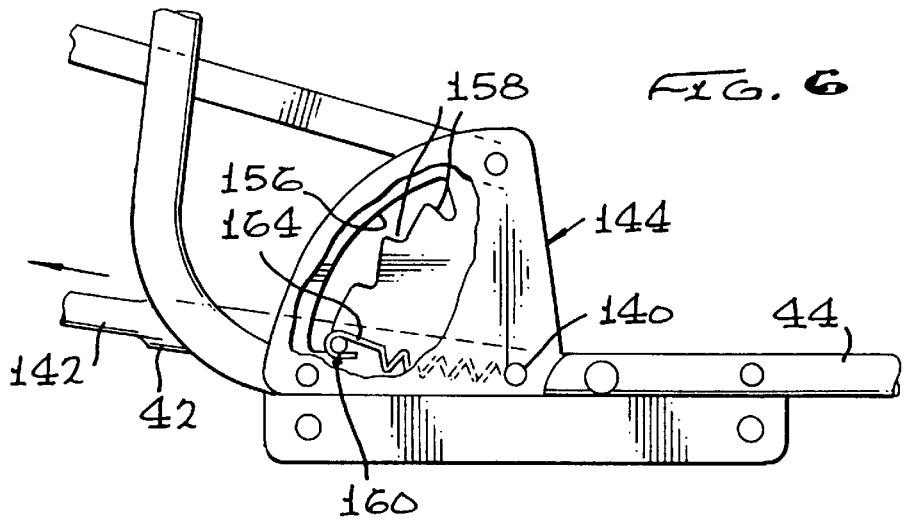

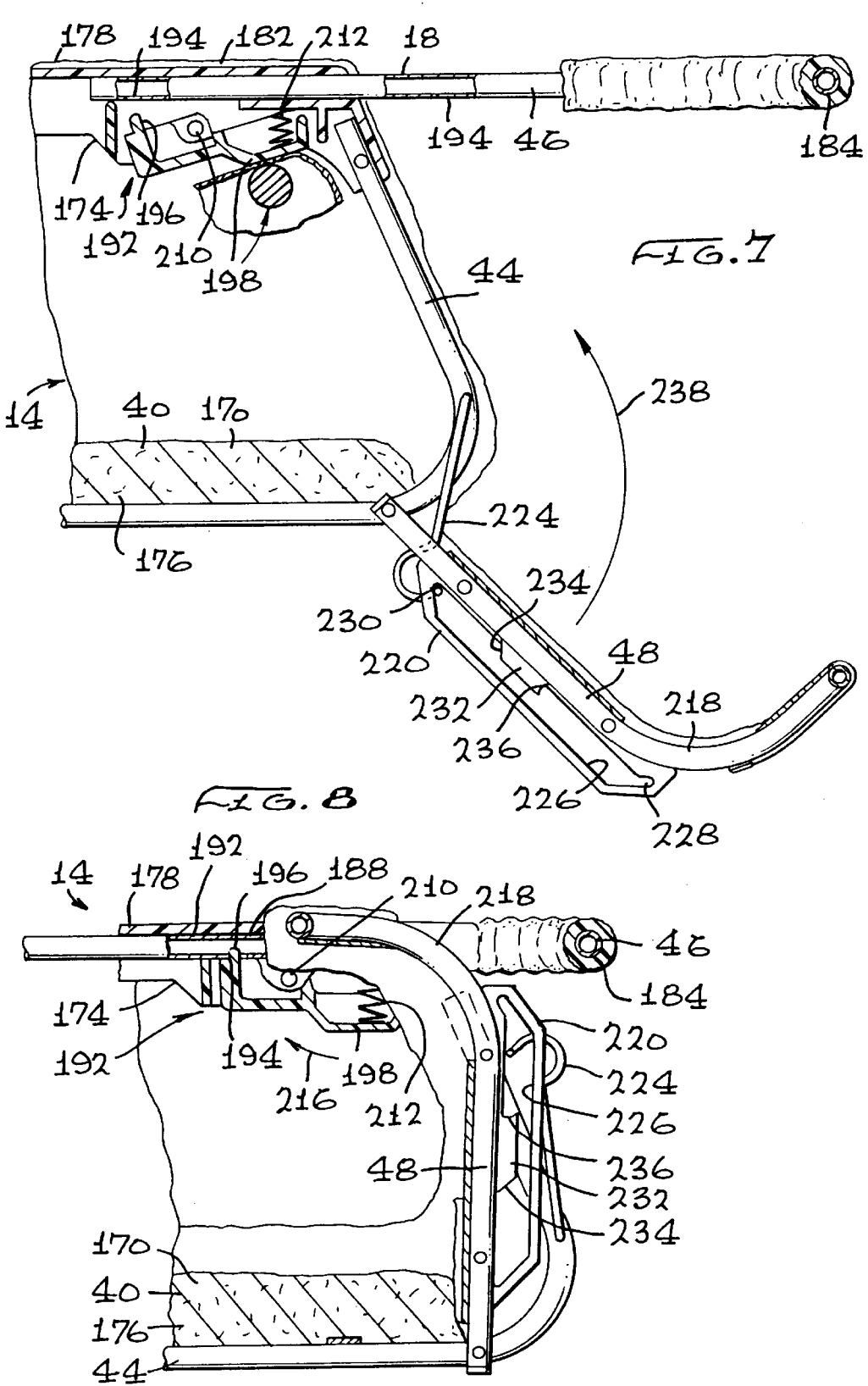

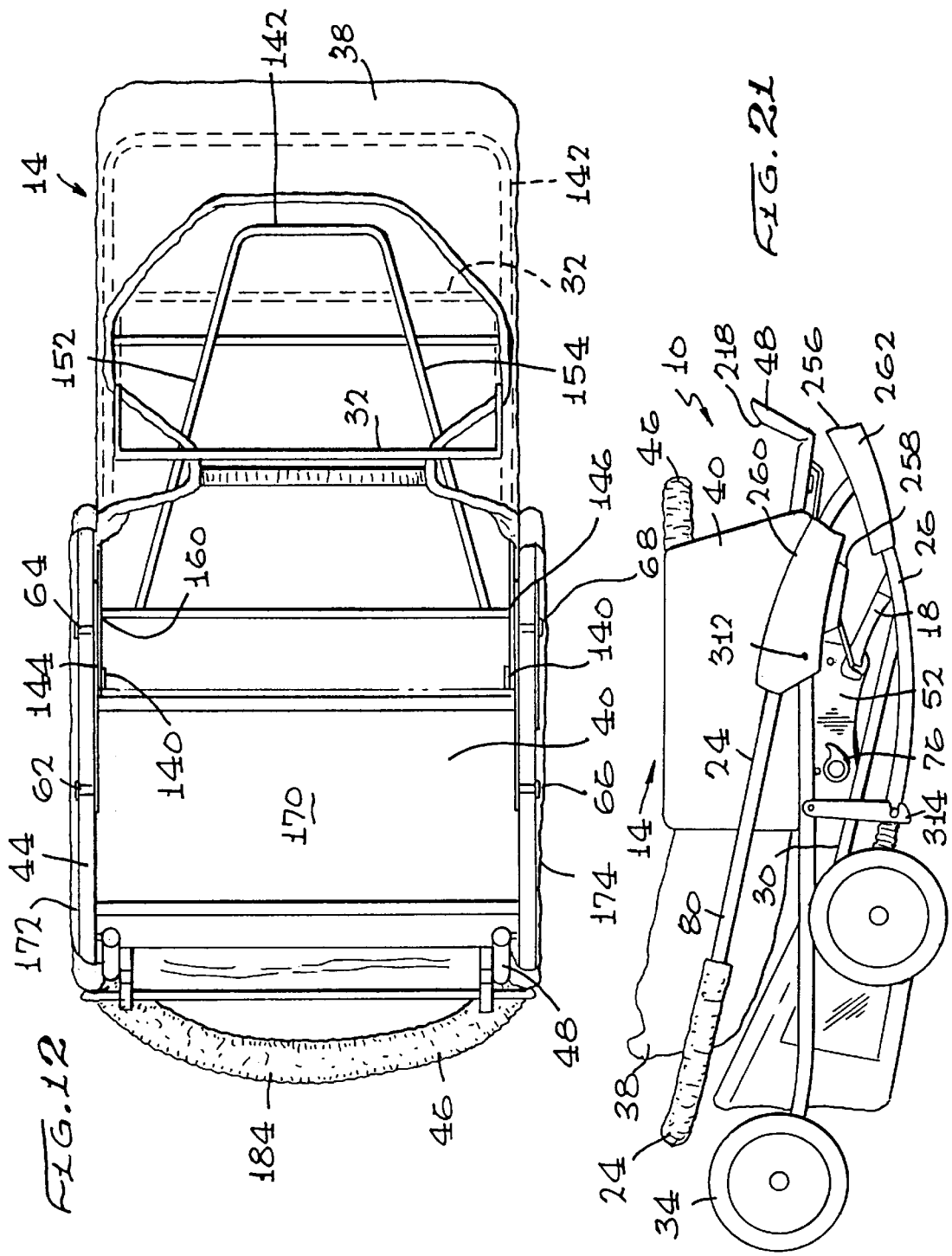

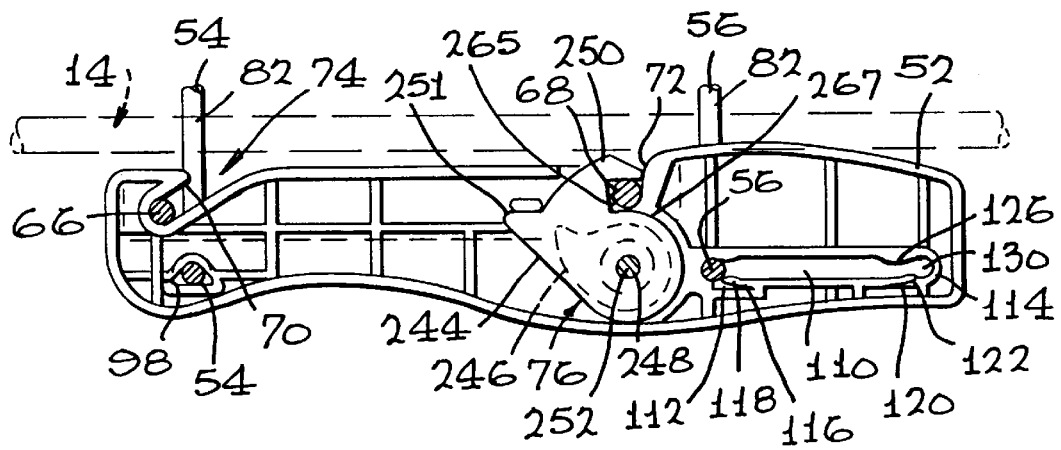
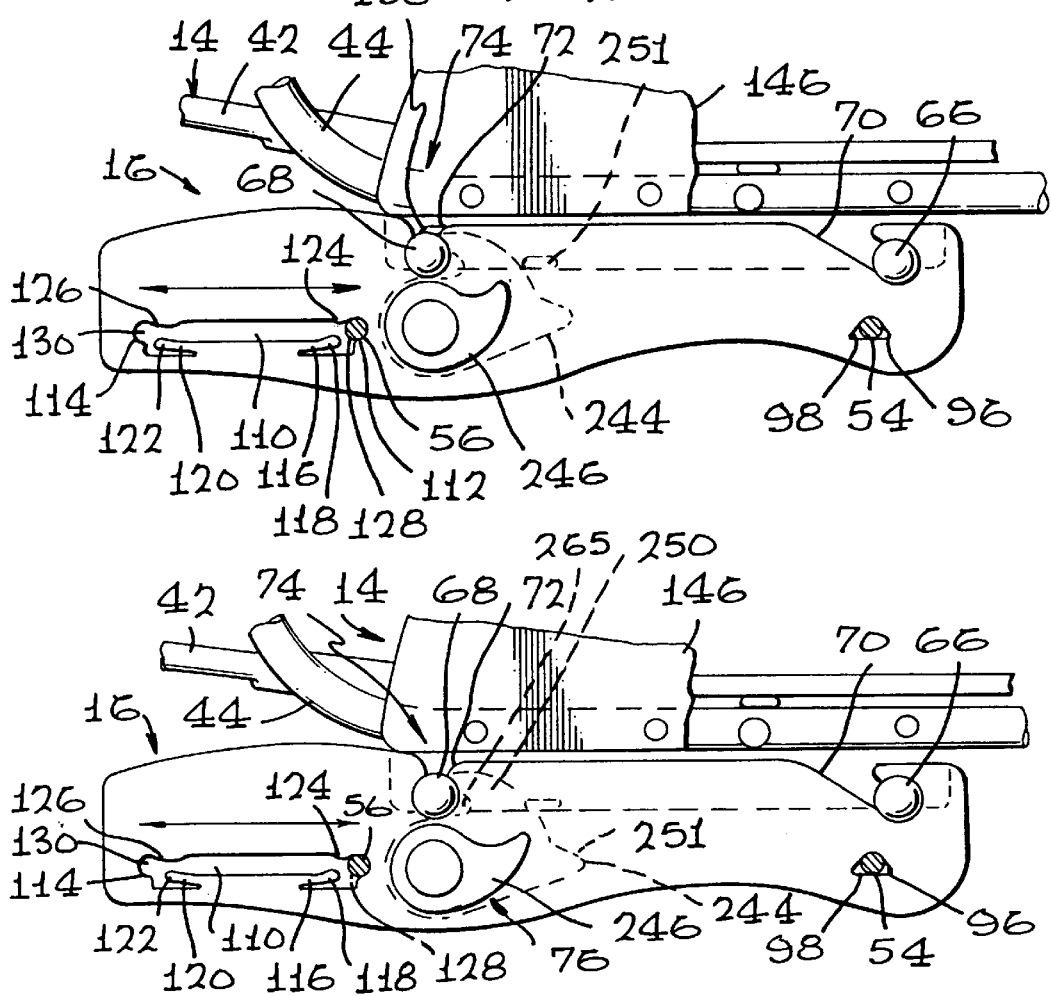

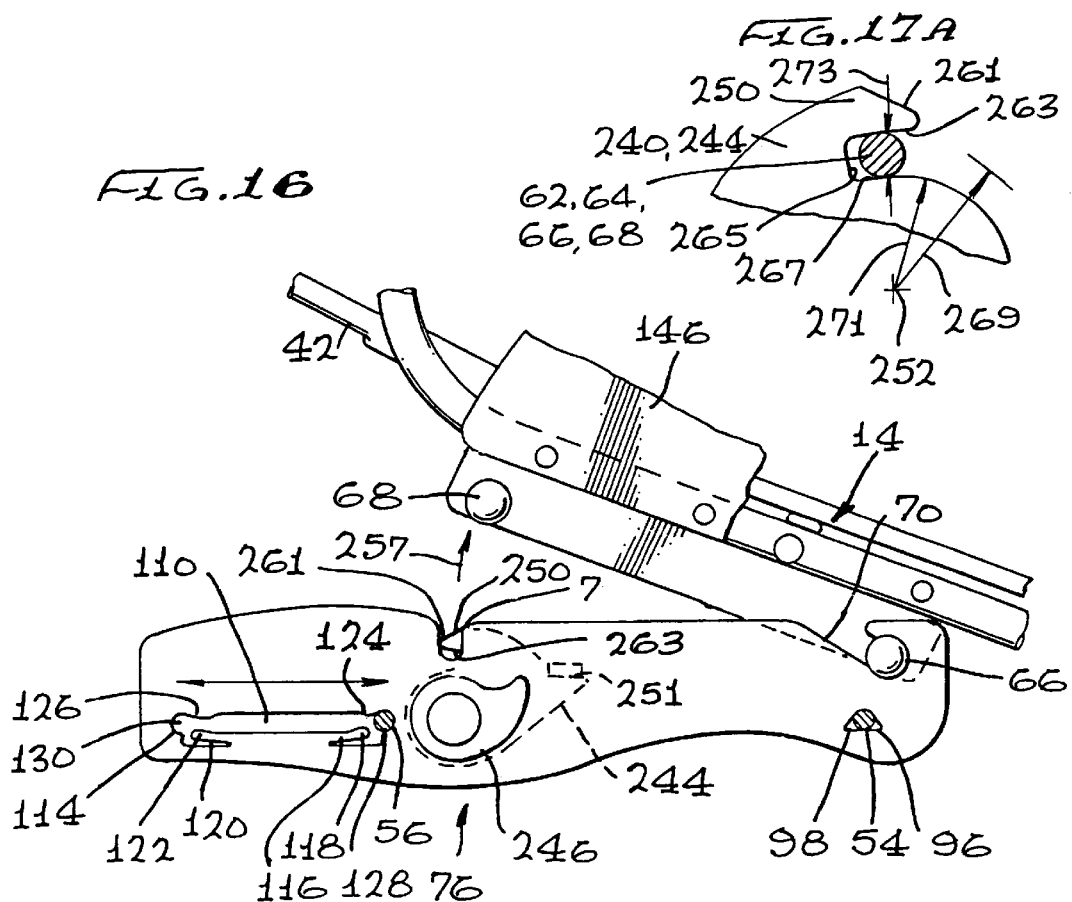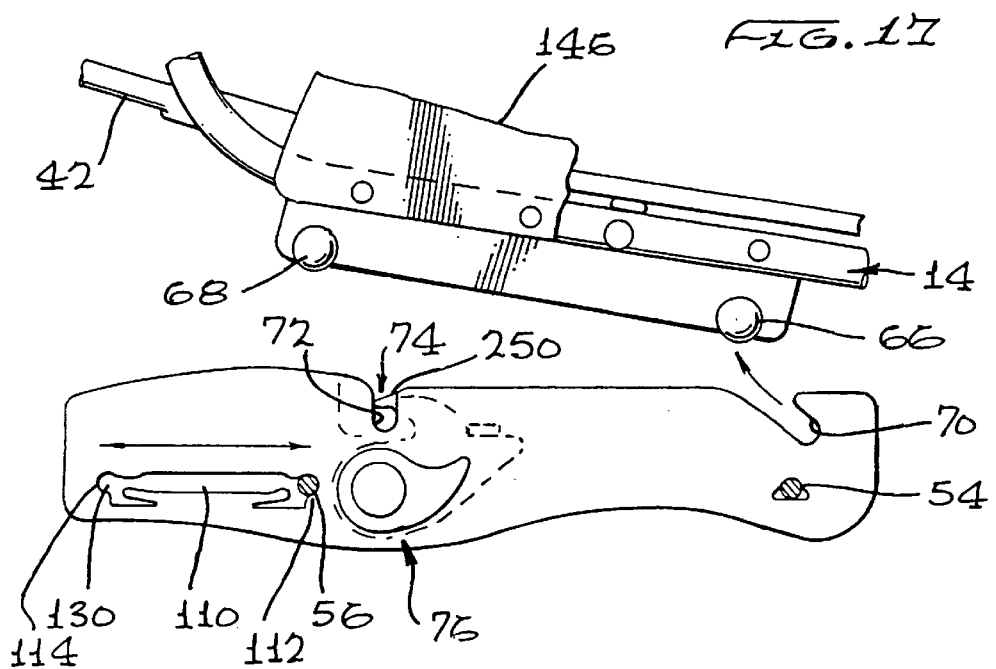

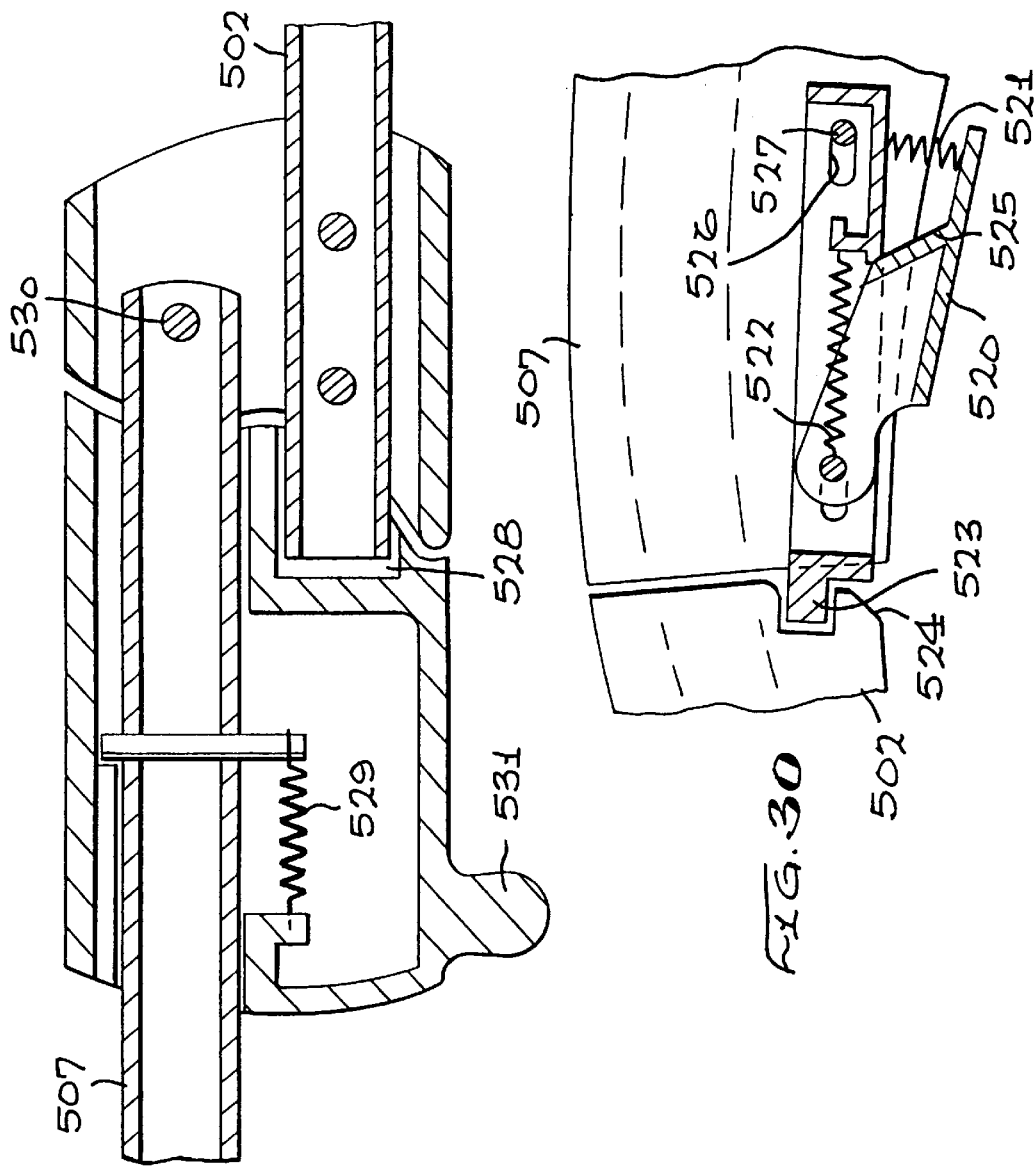

CHILD CARRIER

CROSS REFERENCE TO RELATED APPLICATIONS

This is a continuation-in-part application of U.S. application Ser. No. 08/598,771, now abandoned, entitled "Cradle Type Baby Carriage" filed Feb. 9, 1996, which claims the right of priority to Chinese Application Serial No. 95111534.0 filed Feb. 15, 1995 by Mr. Zheng Huan Song. It is also related to Chinese Application Serial No. 96205575.1 entitled "Cradle Type Baby Carriage" filed Mar. 4, 1996 by Mr. Zheng Huan Song. The disclosure of the above identified applications is incorporated by reference herein in the entirety, including the drawings.

FIELD OF THE INVENTION

The present invention relates to child carriers, and particularly to strollers, carriages, and the like. More particularly, the present invention relates to a child carrier which has a frame supported on wheels and a seat that is capable of moving relative to the frame if desired by a user of the child carrier.

BACKGROUND OF THE INVENTION

Strollers and carriages are used by caregivers to transport infants and young children from one place to another. Typically, carriages include flat mattress-like surfaces for supporting infants while strollers include chair-like seats for supporting toddlers. A stroller or carriage typically includes a frame having a push handle, wheels mounted on the frame, and a child-receiving mattress or seat mounted on the frame.

Strollers and carriages are well known in the art. See, for examples of strollers, Chinese Patent No. 93220881.9 to Yu; U.S. Pat. Nos. 2,523,567 to Grant; 3,871,701 to Gesslein; 4,733,882 to Kassai; 5,257,799 to Cone et al.; 4,544,178 to Al-Sheikh et al.; and 4,280,716 to Vonsbaek et al.

Grant (U.S. Pat. No. 2,523,567) describes a baby carriage including an inner swinging basket having means for transmitting movement of a crank which is movably connected to the rear wheel for swinging or rocking the basket. Yu (Chinese Patent No. 93220881.9) describes a baby carriage including a swinging seat driven by an electric motor.

In Chinese Utility Model Application 92215144.X, published Oct. 14, 1992, an arc-shaped or curved mounting is provided at the lower portion of the baby carriage frame to add a cradle function to the baby carriage. When the carriage is to be used as a cradle, the wheels are folded upward to make the arc-shaped or curved mounting land on the ground to rock the carriage. When the carriage is to be used as a hand-pushed baby carriage, the wheels are lowered and locked so that the curved mounting is in a suspended state. However, due to the presence of a pair of curved mountings, complicated manufacturing processes are involved in the making of this type of baby carriage with a cradle function, resulting in an increased manufacturing cost. Moreover, it is inconvenient to use this type of baby carriage because the changeover from a hand-pushed carriage to a rocking carriage requires raising or lowering the wheels.

There are many examples of child carriers and seats which can be folded from their use positions to their storage positions. See, for example, U.S. Pat. Nos. 5,257,799 to Cone et al.; 4,544,178 to Al-Sheikh et al.; and 4,280,716 to Vonsbaek et al.

SUMMARY OF THE INVENTION

What is needed is a child carrier having a child-receiving seat that is able to rock or glide relative to the child carrier frame or to be locked into a stationary position relative to the child carrier frame at the election of a user of the child carrier. Caregivers who use child carriers to move infants or toddlers about would be pleased with a child carrier that could be adjusted easily to release a child-receiving seat normally fixed in a stationary position relative to the child carrier frame so that the seat could gently rock or glide relative to the child carrier frame in such a way as to soothe a baby riding on the seat while the child carrier is being pushed by the caregiver. Preferably, the released child carrier seat could also be moved back and forth manually by a caregiver relative to the child carrier frame to soothe the baby passenger while the child carrier frame remains stationary relative to the ground.

Child caregivers would also appreciate a child carrier having a child-receiving seat that could be removed easily from the child carrier frame for use as a bassinet apart from the child carrier. Preferably, the seat can then be installed on the child carrier frame in either a rear-facing orientation or a front-facing orientation to provide a rear-facing carriage for infants or a front-facing stroller for toddlers. It is also preferred that the child-receiving seat could be converted easily by a caregiver between a flat-down bed-like carriage position well-suited to accommodate a sleeping infant and an upright chair-like stroller position well-suited to accommodate an active toddler.

Earlier versions of a rocking and gliding child carrier seat are disclosed in Mr. Zheng Huan Song's U.S. patent application No. 08/598,771, filed on Feb. 9, 1996 and his Chinese Patent Application Nos. 94242511.1 filed Aug. 27, 1994 and issued Jun. 21, 1995 and 96205575.1 filed Mar. 4, 1996, incorporated by their entirety herein, including all the drawings.

In a first aspect, the present invention features a child carrier including a frame, wheels disposed at the lower portion of said frame for travelling on a supporting surface, a handbar joined to the frame for manually pushing the frame, a seat, and means coupled to the seat and frame for (a) supporting the seat, and (b) allowing and controlling the swinging movement of the seat relative to the frame when the frame is moving or remains stationary relative to the supporting surface. Optionally, a locking device is provided which locks the swinging unit to the frame when engaged and unlocks the swinging unit from the frame when disengaged. This locking device enables a caregiver to transport a child in the child carrier without exposing the child to any rocking or gliding motion.

In a second aspect, the present invention features a child carrier including a frame, wheels disposed at the lower portion of said frame for travelling on a supporting surface, a handbar joined to the frame for manually pushing the frame, and a seat whose orientation in relation to the pushbar is reversible to provide either a forward or rearward facing stroller or carriage.

In a third aspect, the present invention features a child carrier including a frame, wheels disposed at the lower portion of said frame for travelling on a supporting surface, a handbar joined to the frame for manually pushing the frame, and a seat which is removable from the frame to provide a bassinet.

In a fourth aspect, the present invention features a child carrier including a frame, wheels disposed at the lower portion of said frame for travelling on a supporting surface, a handbar joined to the frame for manually pushing the frame, a seat, whereby the child carrier is configured to fold from a stroller or carriage position to a collapsed storage position.

This invention also features a child carrier having all the above mentioned features, including, but not limited to, a versatile seat and seat support mechanism designed to enable a caregiver to convert the seat to a front- or rear-facing position so as to provide a front-facing stroller for toddlers or a rear-facing carriage for infants, to select a rocking, gliding, or stationary position for the seat relative to the frame, and to lift the seat away from the frame for use as a bassinet.

Additional objects, features, and advantages of the invention will become apparent to those skilled in the art upon consideration of the following detailed description of preferred embodiments exemplifying ways of carrying out the invention, and from the drawings and the claims.

BRIEF DESCRIPTION OF THE DRAWINGS

FIG. 2 is a partial side elevational view, with portions broken away, showing the child carrier further including a swing unit connecting the seat to the frame, the swing unit including a seat-coupling bar connected to the seat and fore and rear U-shaped swing arms pivotably connected to the seat-coupling bar and frame, and the seat-coupling bar being formed to include spaced-apart first and second slots configured to receive first and second seat attachment pins connected to the seat and a rear swing arm adjustment slot configured to receive the rear U-shaped swing arm;

FIGS. 3 and 4 are partial side elevational views similar to FIG. 2 showing the rear U-shaped swing arm fixed in a rear position within the rear swing arm adjustment slot in FIG. 3 and a forward position within rear swing arm adjustment slot in FIG. 4, when the rear U-shaped swing arm is fixed in the rear position within rear swing arm adjustment slot the seat moves in a "rocking" motion relative to the frame, and when the rear U-shaped swing arm is fixed in the forward position within rear swing arm adjustment slot the seat moves in a "gliding" motion relative to the frame.

FIG. 3 is a partial side elevational view similar to FIG. 2 showing the fore and rear swing arms connected to the frame at upper swing arm attachment points, the rear swing arm situated in the rear position within rear swing arm adjustment slot, and rocking motion of the seat relative to the frame as the fore and rear swing arms, seat-coupling bar, and seat are permitted to rotate relative to the frame about the upper swing arm attachment points;

FIG. 4 is a partial side elevational view similar to FIG. 3 showing the rear swing arm situated in the forward position within rear swing arm adjustment slot and gliding motion of the seat relative to the frame as the fore and rear swing arms, seat-coupling bar, and seat are permitted to rotate relative to the frame about the upper swing arm attachment points;

FIG. 5 is a partial rear elevational view, with portions cutaway, of the child carrier of FIG. 1 showing a movable release bar situated to lie adjacent to the seat back and movable relative to the seat back to adjust the orientation of the seat back relative to the seat bottom;

FIG. 6 is a partial sectional view taken along line 6—6 of FIG. 5 showing the child carrier further including a seat back frame configured to support the seat back, a seat bottom frame configured to support the seat bottom, and a seat back orientation device connected to the seat back frame and the seat bottom frame, the seat back orientation device being formed to include a curved slot having a plurality of spaced-apart notches, the movable release bar including a detent connected to a spring for biasing the detent into one of the plurality of spaced-apart notches;

FIGS. 7 and 8 are partial side elevational views, with portions cut away, showing the seat further including an extendible front bar and a pivotable foot rest connected to the seat bottom frame and movable between a plurality of positions;

FIG. 7 is a partial side elevational view, with portions cut away, showing the extendible front bar in an extended position, a user actuating a front bar release mechanism so that the extendible front bar may be moved relative to the seat bottom frame between a plurality of positions, the extendible front bar being formed to include a plurality of apertures configured to receive a detent formed on the front bar release mechanism so that the position of the extendible front bar may be fixed relative to the seat bottom frame, and the foot rest being situated in a lowered, downwardly-extending position;

FIG. 8 is a partial side elevational view, with portions cut away, showing the extendible front bar in a retracted position and the footrest in an upright position adjacent to the retracted extendible front bar;

FIGS. 9 and 10 show the child carrier in a carriage position as opposed to the stroller position shown in FIG. 1, the child carrier is in the stroller position when the extendible front bar is in its extended or retracted position and the foot rest is in its lowered, downwardly-extending position, as shown in FIG. 7, and the seat back is elevated to lie in an upright position relative to the seat bottom as shown in FIG. 1, and the child carrier is in the carriage position when the extendible front bar is in its retracted position and the footrest is in its upright position adjacent to the retracted extendible front bar, as shown in FIG. 8, and the seat back is oriented to lie in the same plane as the seat bottom as shown in FIG. 10;

FIG. 9 is a top plan view of the child carrier in the carriage position;

FIG. 10 is a partial side elevational view of the child carrier in the carriage position;

FIG. 12 is a bottom plan view of the seat showing the orientation of the seat bottom frame, seat back frame, moveable release bar, and seat attachment pins;

FIG. 13 is a rear elevational view of one of the seat-coupling bars showing seat attachment pins of the seat secured within the first and second slots formed in the seat-coupling bar and a seat-locking device coupled to the seat-coupling bar, the seat-locking device includes a rotatable pin-retaining mechanism and an actuator (shown in phantom on the opposite side of the seat-coupling bar), and the rotatable pin-retaining mechanism includes an arm configured to trap and retain the second seat attachment pins in the second slot formed in the seat-coupling bar;

FIGS. 14–17 are partial side elevational views of the seat-coupling bar of FIG. 13 showing the procedure and steps for removing the seat from the seat-coupling bar;

FIG. 14 is a partial side elevational view showing the opposite side of the seat-coupling bar shown in FIG. 13 and the first and second seat attachment pins of the seat secured within the first and second slots formed in the seat-coupling bar;

FIG. 15 is a partial side elevational view similar to FIG. 14 showing the rotatable pin-retaining mechanism being rotated by the actuator to release the second seat attachment pin from the second slot formed in the rotatable pin-retaining mechanism;

FIG. 16 is a partial side elevational view similar to FIG. 15 showing the seat being lifted upwardly so that the second seat attachment pin slides out of the second slot formed in the seat-coupling bar;

FIG. 17 is a partial side elevational view similar to FIG. 16 showing the seat being moved at an angle forward and upward away from the seat-coupling bar so that the first seat attachment pin slides out of the first slot formed in the seat-coupling bar;

FIG. 17A is a partial side elevational view of the rotatable pin-retaining mechanism and a seat attachment pin trapped within a slot formed in the rotatable pin-retaining mechanism;

FIG. 21 is a side elevational view of the child carrier in its collapsed folding position;

FIG. 22 is a partial side elevational view of the child carrier folding device connected to the first housing section, the child carrier folding device including a movable detent situated within a notch formed in the second housing section to prevent the first housing section and first frame section from moving relative to the second housing section and the second frame section;

FIG. 23 is a partial side elevational view similar to FIG. 22 showing a user pressing an actuator of the child carrier folding device to move the detent of the child carrier folding device out of the notch formed in the second housing section to permit the first frame section to move relative to the second frame section so that the child carrier may be folded to its folded collapsed position shown in FIG. 21;

FIG. 24 is a side elevational view of a second embodiment of a child carrier according to the present invention showing the child carrier having a seat that is capable of swinging (solid and phantom lines) relative to the child carrier frame;

FIGS. 30–32 are partial sectional views of three embodiments of a locking device that permits a user to fold the child carrier to its collapsed folded position;

FIG. 30 is a partial sectional view of the frame showing the frame having a front leg and a front supporting rod and a locking device situated to lie between the front leg and-front supporting rod;

FIG. 31 is a partial sectional view similar to FIG. 30 showing a second embodiment of a locking device situated to lie between the front leg and front supporting rod of the frame; and FIG. 32 is a partial sectional view similar to FIGS. 30 and 31 showing yet another embodiment of a locking device situated to lie between the front leg and front supporting rod of the frame.

DESCRIPTION OF THE PREFERRED EMBODIMENTS

Figure 1:
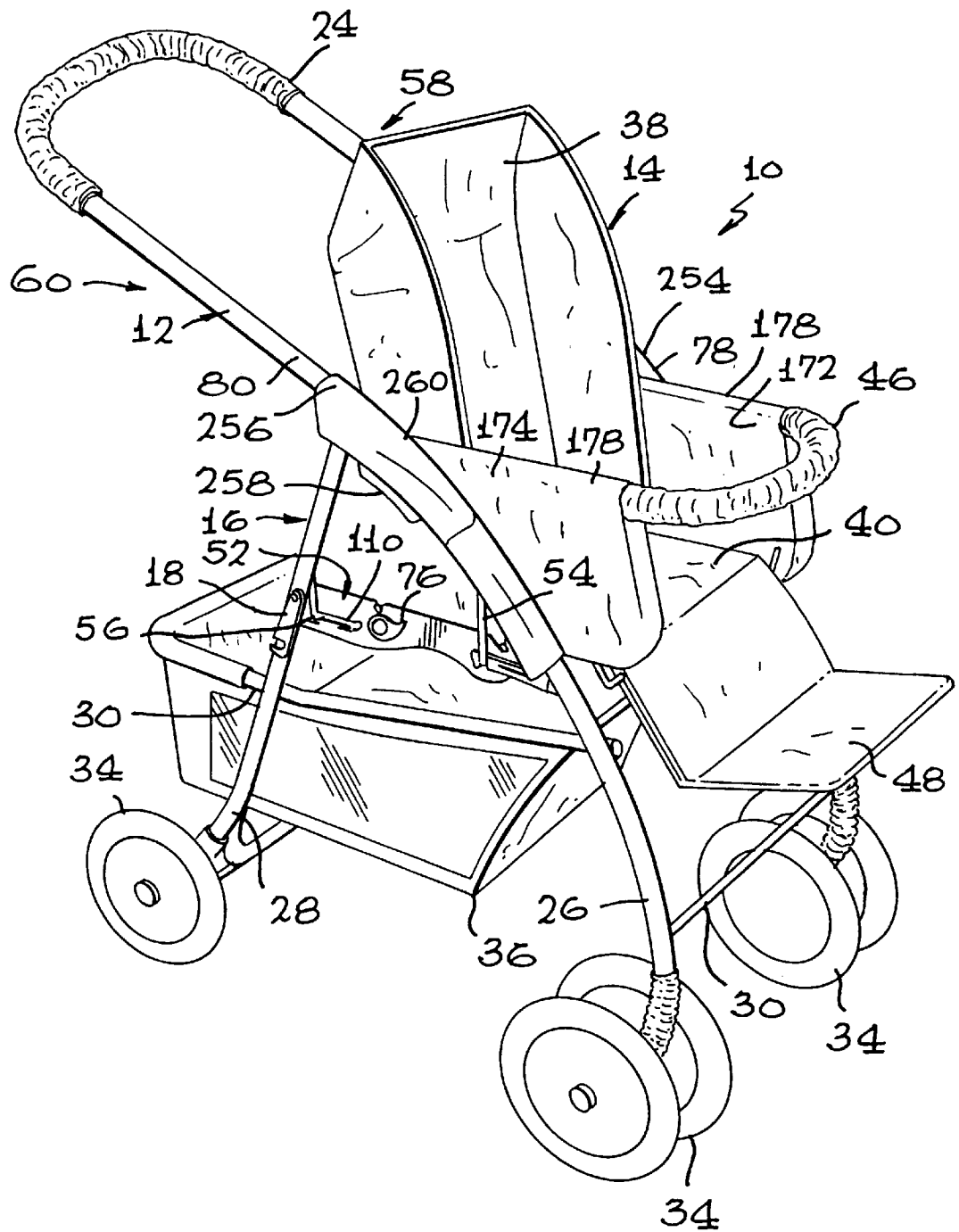
FIG. 1 is a perspective view of a child carrier according to the present invention showing the child carrier including a frame, a push bar coupled to the frame, a seat supported by the frame and oriented in a forward-facing stroller position facing away from the push bar, and wheels connected to the bottom of the frame.

In this application, "swinging" includes "rocking" and "gliding" motions. By "rocking" is meant the motion of a swing (e.g. a bench on a trapeze) where the top remains still while the bottom moves back and forth, the swaying motion of the arm of a metronome where the bottom remains still while the top moves back and forth, or the rolling motion of a cradle. By "gliding" is meant the horizontal back-and-forth motion of a backyard bench glider. In the scope of this application, the horizontal gliding of the swinging unit may be accompanied by some vertical lifting and dropping, albeit the ratio of vertical movement/horizontal movement is much smaller than that of a pendulum-style swing. In preferred embodiments, the amount of vertical movement is no more than 30%, 20%, 10%, 5%, or 1% of that of the horizontal movement.

Means for controlling the swinging movement of the child seat may include one, two, or a plurality of arms each having one end pivotedly connected to the frame and the other end capable of rocking or gliding relative to the frame. Such means may also comprise a track built on the frame and a crossbeam roller which rolls back and forth along the track.

In preferred embodiments of the present invention, the child carrier includes a swinging unit connecting the seat and the frame. The swinging unit has a switching device which allows a caregiver to manually switch the swinging motion of the swing unit from a rocking to gliding, and vice versa.

For example, the swinging unit includes a seat-coupling bar and a fore swing arm and a rear swing arm pivotally connected to the frame. The pivot connection between the swinging unit and the frame permits the seat to move relative to the frame in a gliding or rocking motion.

One of the swing arms is adjustable to change the orientation of the two swing arms relative to each other. By changing the orientation of the two swing arms relative to each other, the user of the child carrier can select between a gliding motion of the seat relative to the frame and a rocking motion of the seat relative to the frame. In one embodiment, the switching device controls the motion of the swinging unit by adjusting the distance between the fore and rear swing arms. For example, the unit essentially glides back and forth horizontally when the distance is adjusted so that the swing arms are parallel with each other, and the unit essentially rocks when the distance is adjusted so that the swing arms diverge from or converge toward each other.

In a preferred embodiment, the switching device is in the form of an adjustment slot in the seat coupling bar. A swing arm passes through the slot and can be adjusted to a plurality of positions along the slot to change the distance between the two swing arms. To retain the swing arm at a particular location along the slot, a flexible tab is provided which has one detent and extending into the swing arm adjustment slot to form an attachment location. When the swing arm is pressed against the detent, the tab flexes to permit the swing to pass through.

In another preferred embodiment, the switching device is a swing arm adjustment slot provided at the lower portion of the seat in the forward and backward direction. One end of one of the fore and rear swing arms passes through the adjustment slot to support the seat and is capable of moving back and forth along the slot. The other one of the fore and rear swing arms is also joined to the seat to support the seat. A push-and-pull handle can be provided at the bottom of the seat with one end joined to the swing arm passing through the adjustment slot and the other end movably joined to a pivot at the bottom of the seat.

A long slot is provided on the push-and-pull handle at the junction of the handle and the pivot for the pivot to glide in the forward and backward direction. The pivot passes that long slot to join the push-and-pull handle. A damping device is also provided between the pivot and the wall of the long slot. The slot width at both end portions of the long slot is slightly larger than the diameter of the pivot while the slot width in the middle portion of the long slot is slightly less than the diameter of the pivot. A parallel stripe slot is provided adjacent to the long slot to make the slot wall of the long slot elastic.

The pivot could also be joined to a locking rod moving handle which is able to swivel around that pivot, on the locking rod moving handle in the front and rear of the pivot are hinged two transverse locking rods, the outer end points of those two locking rods are aligned with the locating holes on the two sides of the frame.

Also in preferred embodiments of the present invention, the child carrier includes an anti-swing latch capable of coupling the frame and the swing unit so that the seat is prevented from moving relative to the frame. If the user of the child carrier wants the seat to remain stationary relative to the frame, the user simply couples the frame and swing unit together using the anti-swing latch. If the user of the child carrier wants the seat to move relative to the frame in the above-mentioned rocking or gliding motion, the user simply uncouples the locking bar from the swing unit.

In another preferred embodiment, the seat is removable from the swing unit and frame to be used as a stand alone bassinet. When the seat is part of the child carrier, the seat is connected to the swing unit. A seat locking device is provided to permit a child carrier user to easily remove the seat from the swing unit. For example, a seat attachment pin is provided at the lower portion or the bottom of the seat and the seat locking device has a seat-coupling bar linked to the frame which includes a slot having an open end configured to receive the seat attachment pin. The seat-locking device may have a pin-retaining device configured to move between a seat-locking position blocking the open end of the slot and a seat-unlocking position opening the open end of the slot and means for moving the pin-retaining device so that the seat can be removed from the seat-coupling bar by moving the pin-retaining device from the seat-locking position to the seat-unlocking position. A spring may be provided to bias the pin-retaining device toward the seat-locking position.

In addition, the seat can be connected to the swing unit in one of two positions so that the seat faces forward away from the user pushing the child carrier or the seat faces rearward toward the user pushing the child carrier.

Furthermore, the seat may have two seat attachment pins spaced apart from each other, and the seat-coupling bar may have two slots spaced apart from each other and each having an open end configured to receive either one of said seat attachment pins, and the two slots are configured to receive said two attachment pins at the same time in either forward or backward orientation so that the seat may be coupled to the frame in either a forward-facing orientation or a rearward-facing orientation.

In yet another preferred embodiment, the child carrier may be configured in a carriage position or a stroller position. The seat further includes a seat bottom and a seat back that is movable relative to the seat bottom. The seat back may be situated in a lowered position where the seat back and seat bottom lie in substantially the same plane to form a flat surface or in one of a plurality of upright positions where the seat back is upright relative to the seat bottom.

The seat further includes an extendible front bar movable between a retracted position and an extended position, a foot rest movable between an upright position and a lowered, downwardly-extending position, a front end, and a rear end. Both the extendible front bar and the foot rest are connected to the seat bottom adjacent to the front end of the seat.

In the carriage position, the extendible front bar is placed in its retracted position and the foot rest is placed in its upright position adjacent to the retracted extendible front bar. Situating the extendible front bar in its retracted position and the foot rest in its upright position closes the front end of the seat so that an infant lying in the seat will not fall out of the seat. In the carriage position, the seat back is placed in its lowered position relative to the seat bottom so that the seat back and seat bottom form a flat surface on which the infant lies.

In the stroller position, the foot rest is placed in its lowered, downwardly-extending position away from the extendible front bar and the extendible front bar may be placed in its retracted or extended position depending on the size of the toddler sitting in the child carrier. Situating the foot rest in its lowered, downwardly-extending position opens the front end of the seat to permit a toddler's legs to extend out of the opened front end and his feet and lower legs to be supported by the foot rest. In the stroller position, the seat back is situated upright relative to the seat bottom so that the seat back supports the toddler's back and the seat bottom supports the toddler's bottom.

In another preferred embodiment, the frame is collapsible and movable between an unfolded use position and a folded storage position. When the user is finished using the child carrier, the user can fold the child carrier into the folded storage position so that the child carrier may more easily fit into a car trunk, closet, or other confined spaces.

The following description of the preferred embodiments refers to and describes three embodiments of a child carrier, baby carriage, or rocking stroller according to the present invention. The first embodiment illustrates and describes a child carrier 10. The second embodiment illustrates and describes a cradle type baby carriage and is based on U.S. patent application No. 08/598,771 filed Feb. 9, 1996, now abandoned. The third embodiment illustrates and describes a rocking stroller and is based on Chinese patent application No. 96205575.1 filed Mar. 4, 1996.

Embodiment 1

A child carrier 10 according to the present invention is shown in FIG. 1. Child carrier 10 includes a frame 12, a seat 14, and a swing unit 16 connecting frame 12 and seat 14 as shown in FIGS. 1 and 2. Swing unit 16 permits seat 14 to move relative to frame 12 in a rocking motion as shown in FIG. 3 and a gliding motion as shown in FIG. 4. Child carrier 10 further includes an anti-swing latch 18 having a first end 20 pivotably connected to frame 12 and a second end 22 that can be connected to swing unit 16 if a user does not want seat 14 to swing relative to frame 12. An early version of a rocking and gliding child carrier seat is disclosed in Mr. Zheng Huan Song's U.S. patent application No. 08/598,771, filed on Feb. 9, 1996, now abandoned, which application is hereby incorporated by reference herein.

Figure 9:
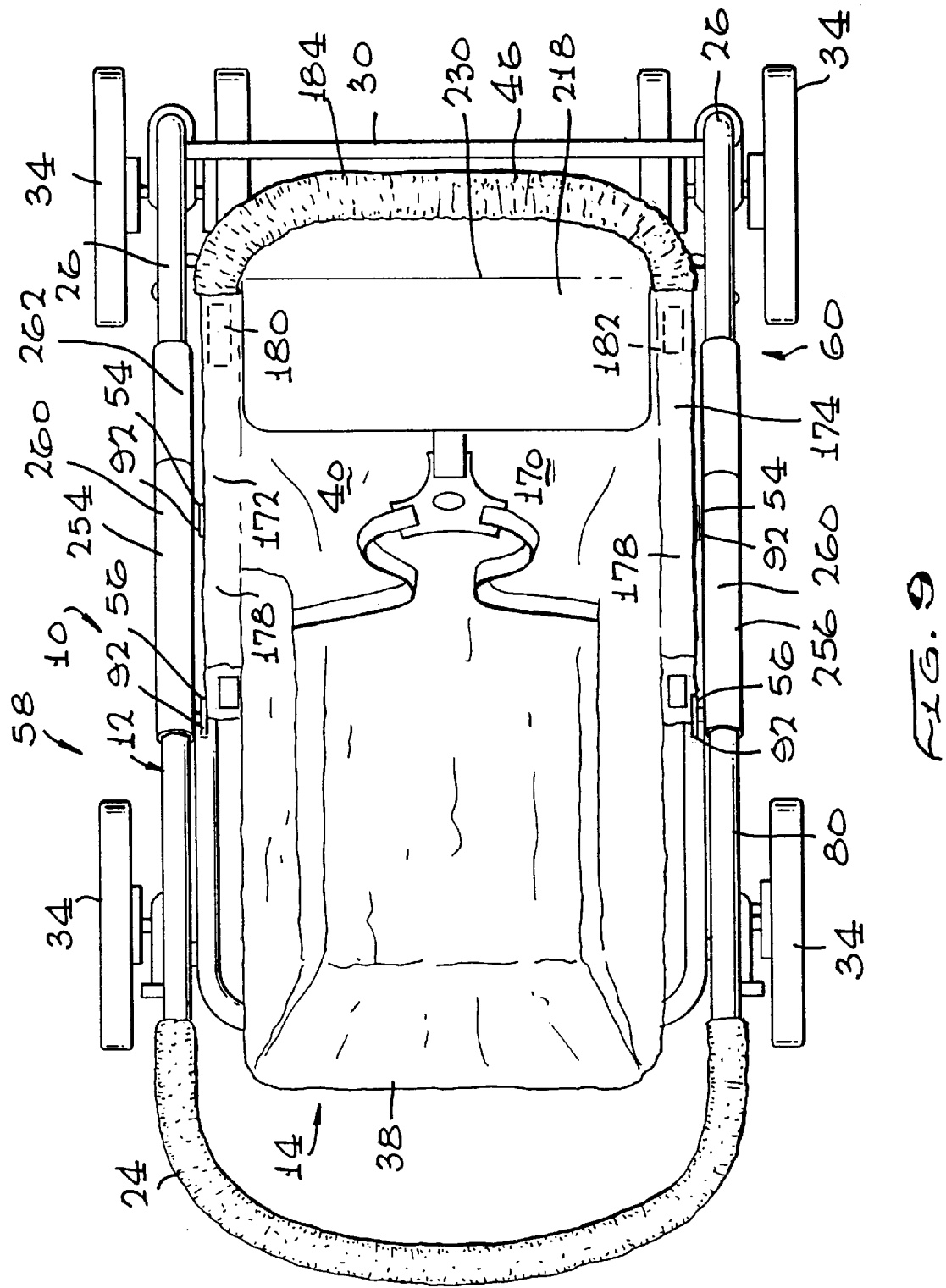

Child carrier 10 can be configured in either a stroller position, as shown in FIG. 1, or a carriage position as shown in FIGS. 9 and 10. Several portions of seat 14 are movable to change child carrier 10 configuration between the stroller and carriage positions.

Figure 18:
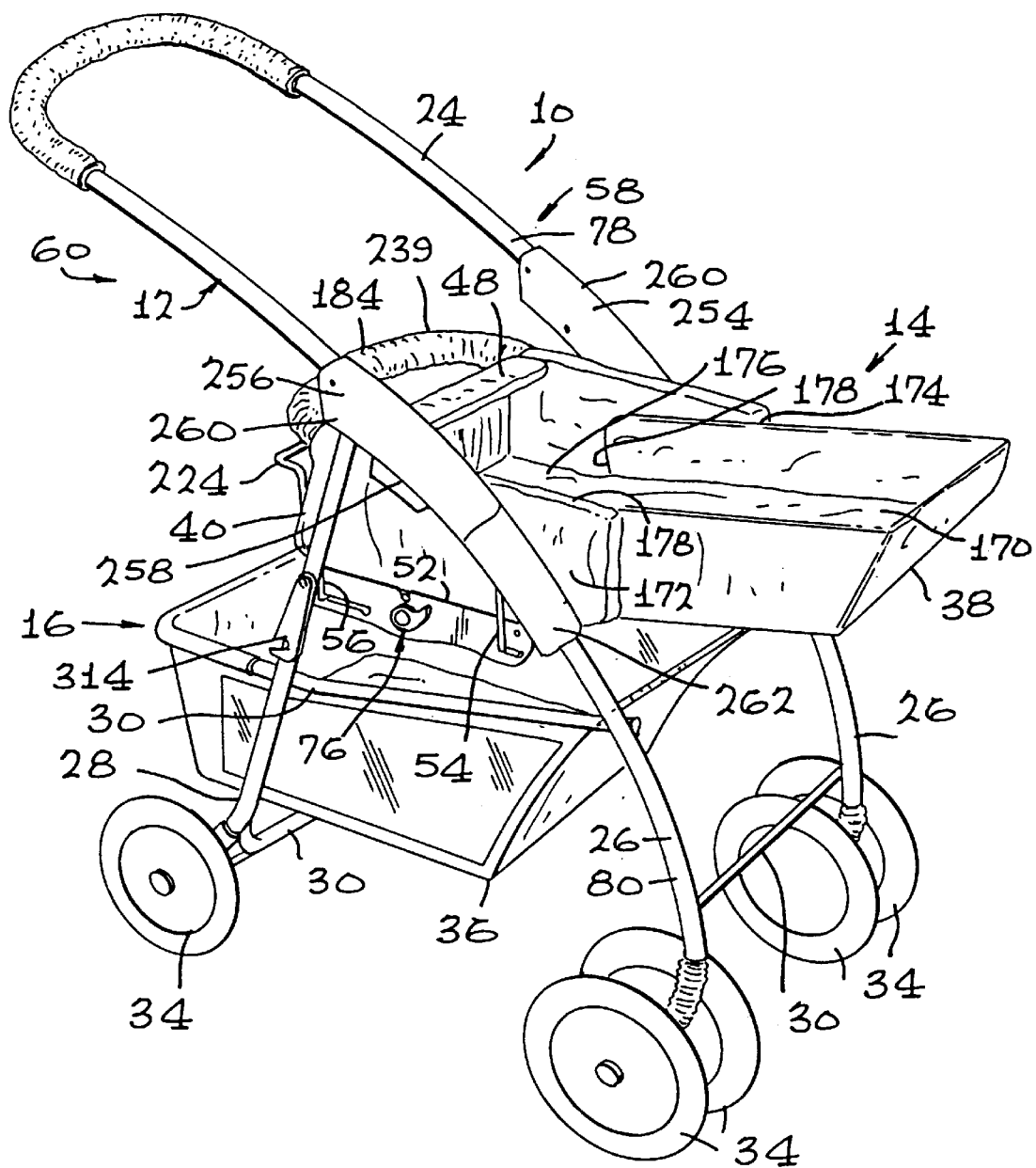
FIG. 18 is a perspective view of the child carrier showing the child carrier in a carriage position and the seat coupled to the seat so that the seat faces rearward toward the push bar as opposed to the seat facing forward away from the push bar as shown, for example, in FIGS. 1, 8, and 10.

Frame 12 includes a push bar or handbar 24 that a user grasps and pushes when pushing child carrier 10. Seat 14 may be oriented relative to frame 12 so that seat 14 faces forward away from push bar 24 as shown, for example, in FIGS. 1 and 9–12 or rearward toward push bar 24 as shown in FIG. 18.

Figure 20:
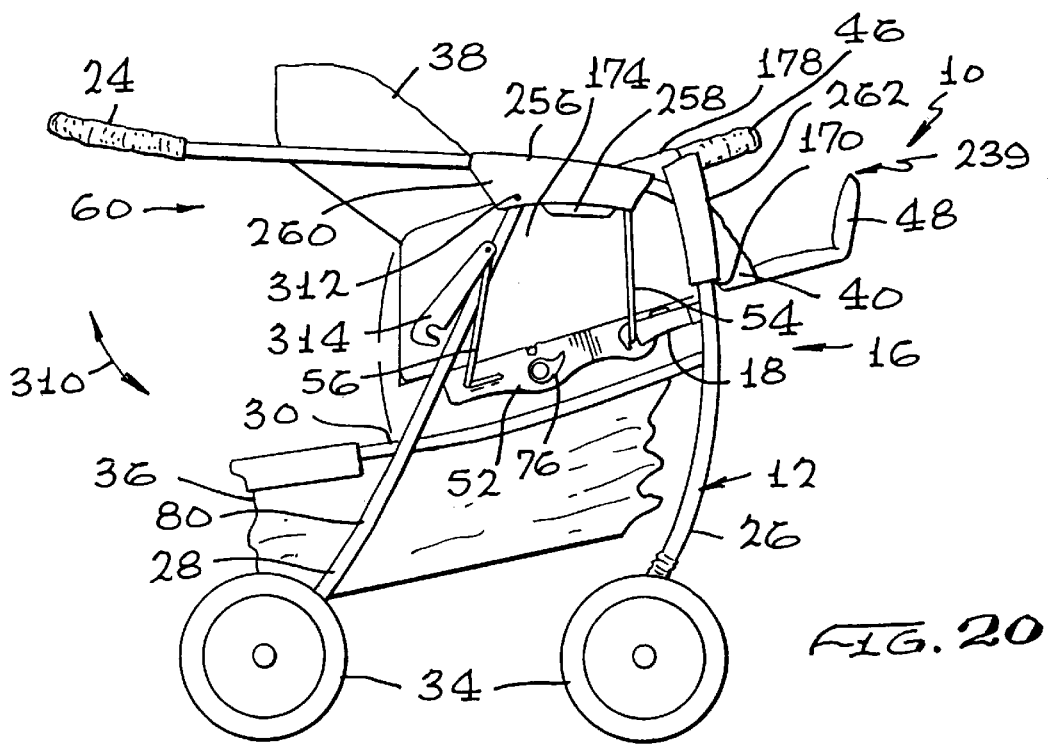
FIG. 20 is a side elevational view of the child seat in an intermediate position between its unfolded position as shown, for example, in FIGS. 1, 9, 10, and 19 and its collapsed folded position.

When a user is finished using child carrier 10, the user may fold child carrier 10 into its collapsed position as shown in FIGS. 20 and 21. Folding child carrier 10 into its collapsed position makes storing child carrier 10 easier.

Frame 12 includes fore legs 26, rear legs 28, and several cross braces 30 connecting fore and rear legs 26, 28 as shown in FIG. 1. Child carrier 10 further includes wheels 34 connected to the bottom end of fore and rear legs 26, 28, and a basket 36 connected to fore and rear legs 26, 28 and situated under seat 14.

Figure 19:
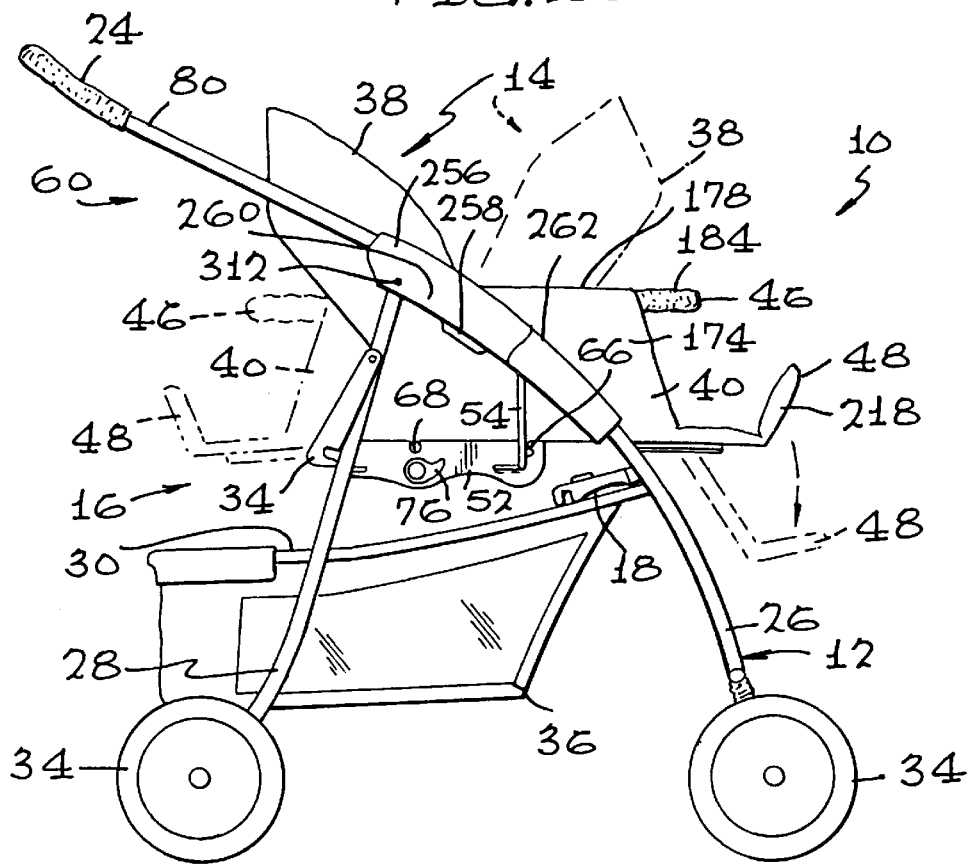
FIG. 19 is a side elevational view showing various orientations of the seat (in solid or phantom) relative to the frame and showing that the seat can be coupled to the seat-coupling bar so that the seat back faces backward toward the push bar or forward away from the push bar, the seat back can be situated in a plurality of orientations relative to the seat bottom, the extendible front bar can be extended or retracted, and the foot rest can be situated in its lowered, downwardly-extending position, its upright position, or an intermediate position between the lowered and upright positions.

Seat 14 includes a seat back 38, a seat bottom 40, a seat back frame 42 configured to support seat back 38, a seat bottom frame 44 configured to support seat bottom 40, an extendible front bar 46 connected to seat bottom frame 44, and a foot rest 48 connected to seat bottom frame 44 as shown in FIGS. 1, 2, 7, and 8. Several of these components are movable to change the orientation of child carrier 10 between the stroller position and the carriage position as shown, for example, in FIG. 19.

Figure 11:
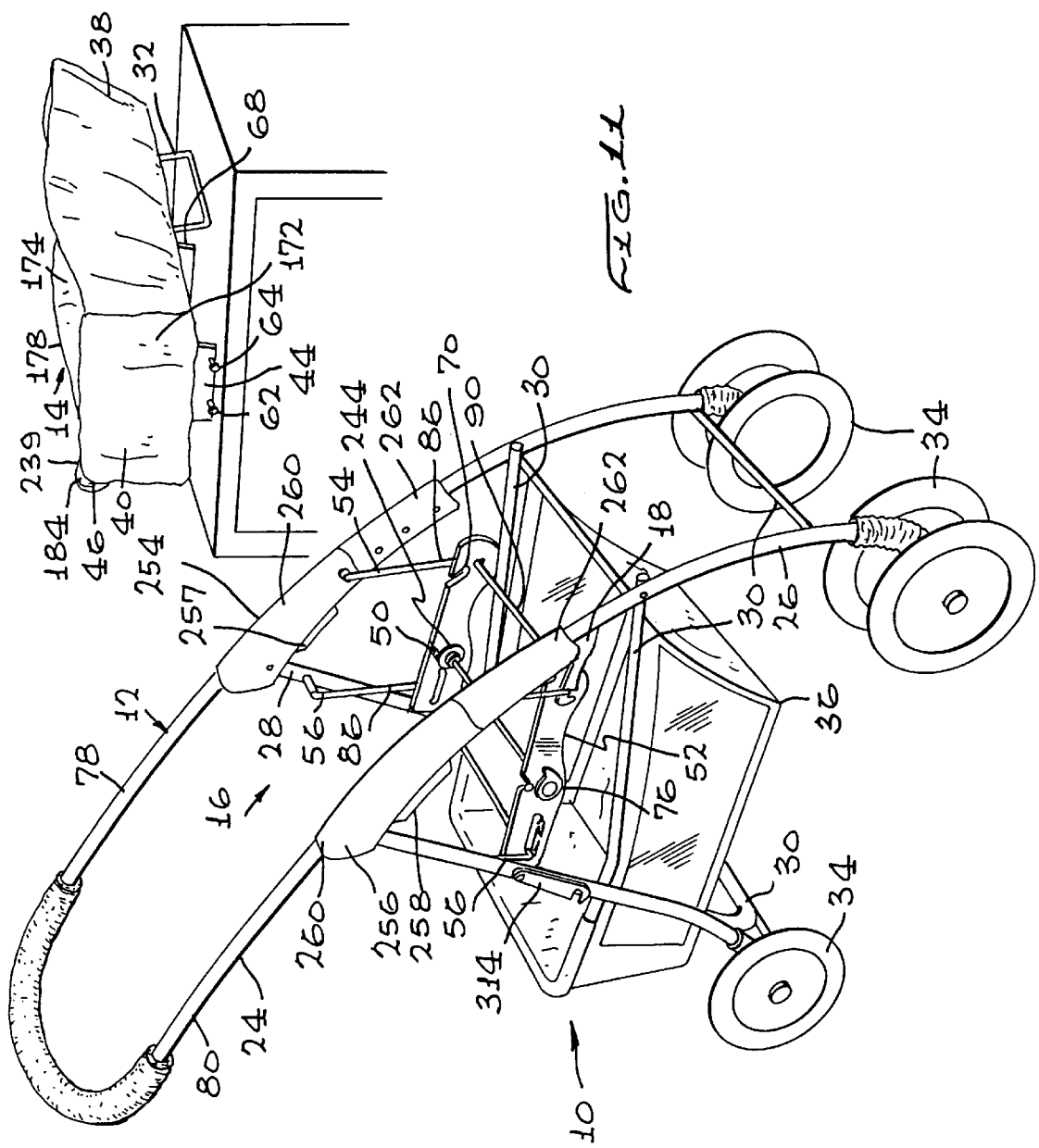
FIG. 11 is a perspective view of the seat removed from stroller so that the seat can be used as a stand alone bassinet.

Swing unit 16 includes first and second seat-coupling bars 50, 52, a fore U-shaped swing arm 54 connected and arranged to extend between frame 12 and seat-coupling bars 50, 52, and a rear U-shaped swing arm 56 spaced apart from fore U-shaped swing arm 54 and connected and arranged to extend between frame 12 and seat-coupling bars 50, 52 as shown in FIGS. 1–4 and 11. Child carrier 10 further includes a left side 58 and a right side 60. Seat-coupling bar 50 is situated on left side 58 of child carrier 10 and seat-coupling bar 52 is situated on right side 60 of child carrier 10 as shown in FIG. 11.

Seat 14 is connected to seat-coupling bars 50, 52 as shown in FIG. 2. Seat 14 includes first and second seat attachment pins 62, 64 connected to seat bottom frame 44 and arranged to face toward first seat-coupling bar 50 and third and fourth seat attachment pins 66, 68 connected to seat bottom frame 44 and arranged to face toward second seat-coupling bar 52 as shown in FIG. 12. Each of first and second seat-coupling bars 50, 52 is formed to include first and second seat attachment pin-receiving slots 70, 72 having an open end 74 configured to receive seat attachment pins 62, 64, 66, 68 as shown in FIGS. 2 and 13–17. A seat locking device 76 is connected to each of seat-coupling bars 50, 52 and configured to close open end 74 of first seat attachment pin-receiving slot 70 to trap a seat attachment pin 62, 64, 66, 68 in each of seat-coupling bars 50, 52.

Frame 12 further includes a left frame side 78 on left side 58 of child carrier 10 and a right frame side 80 on right side 60 of child carrier 10. Fore and rear U-shaped swing arms 54, 56 each include a first end 82 connected to left frame side 78 of frame 12, a second end 84 connected to right frame side 80 of frame 12, a first arm portion 86 extending downwardly from first end 82 toward seat-coupling bar 50, a second arm portion 88 extending downwardly from second end 84 toward seat-coupling bar 52, and a third arm portion 90 connecting and extending between first and second arm portions 86, 88 as shown, for example, in FIGS. 2–5 and 11.

First and second ends 82, 84 of fore and rear U-shaped swing arms 54, 56 are pivotably connected to frame 12 at swing arm upper attachment locations 92 so that fore and rear U-shaped swing arms 54, 56 may rotate about swing arm upper attachment locations 92 in direction 94 as shown in FIGS. 3 and 4. More specifically, first and second ends 82, 84 of fore U-shaped swing arm 54 are pivotably connected to fore legs 26 of frame 12 and first and second ends 82, 84 of rear U-shaped swing arm 56 are pivotably connected to rear legs 28 of frame 12 as shown, for example, in FIG. 2.

Seat-coupling bars 50, 52 are formed to include swing arm-receiving apertures 96 through which third arm portion 90 of fore U-shaped swing arm 54 extends to connect fore U-shaped swing arm 54 to seat-coupling bars 50, 52 at fore U-shaped swing arm lower attachment locations 98. Seat-coupling bars 50, 52 are also formed to include a rear swing arm adjustment slot 110 through which third arm portion 90 of rear U-shaped swing arm 56 extends to connect rear U-shaped swing arm 56 to seat-coupling bars 50, 52. Rear swing arm adjustment slot 110 extends between a first end 112 and a second end 114 spaced apart from first end 112.

Seat-coupling bars 50, 52 further include a first tab 116 having a first detent 118 situated adjacent to first end 112 and arranged to extend into rear swing arm adjustment slot 110, a second tab 120 having a second detent 122 situated adjacent to second end 114 and arranged to extend into rear swing arm adjustment slot 110, a third detent 124 facing into rear swing arm adjustment slot 110 toward first detent 118, and a fourth detent 126 facing into rear swing arm adjustment slot 110 toward second detent 122 as shown in FIGS. 3, 4, and 13–17. First and third detents 118, 124 define a first rear swing arm lower attachment location 128 adjacent to first end 112 and second and fourth detents 122, 126 define a second rear swing arm lower attachment location 130 adjacent to second end 114 as shown in FIGS. 2–4 and 13–17.

Rear U-shaped swing arm 56 is movable between first and second rear swing arm lower attachment locations 128, 130. When rear U-shaped swing arm 56 passes into first rear swing arm lower attachment location 128, first tab 116 flexes downward to permit rear U-shaped swing arm 56 to pass by first and third detents 118, 124 which extend into rear swing arm adjustment slot 110. When rear U-shaped swing arm 56 passes into second rear swing arm lower attachment location 130, second tab 120 flexes downward to permit rear U-shaped swing arm 56 to pass by second and fourth detents 122, 126 which extend into rear swing arm adjustment slot 110.

When rear U-shaped swing arm 56 is situated in first rear swing arm lower attachment location 128, first and second arm portions 86, 88 of fore and rear U-shaped swing arms 54, 56 are parallel. When fore and rear U-shaped swing arms 54, 56 are parallel to each other, seat 14 moves in a horizontal back-and-forth motion in direction 132 relative to frame 12 or what herein will be referred to as "gliding" as shown in FIG. 4.

When rear U-shaped swing arm 56 is situated in second rear swing arm lower attachment point 130, the distance between the fore and rear swing arm lower attachment locations 98, 130 is greater than the distance between swing arm upper attachment locations 92 of fore and rear U-shaped swing arms 54, 56 so that the first and second arm portions 86, 88 of fore and rear U-shaped swing arms 54, 56 are in the shape of a trapezoid as shown in FIG. 3. The greater distance between the fore and rear swing arm lower attachment locations 98, 130 causes seat 14 to move in an approximate pendulum type motion in direction 134 relative to frame 12 or what herein will be referred to as "rocking" as shown in FIG. 4.

If the user of child carrier 10 wants seat 14 to swing relative to frame 12, the user may select the gliding motion of seat 14 relative to frame 12 by placing rear U-shaped swing arm 56 in first rear swing arm lower attachment location 128 of rear swing arm adjustment slot 110. Alternatively, the user of child carrier 10 may select the rocking motion of seat 14 relative to frame 12 by placing rear U-shaped swing arm 56 in second rear swing arm lower attachment location 130 of rear swing arm adjustment slot 110.

If the user does not want seat 14 to swing relative to frame 12, then the user may connect second end 22 of anti-swing latch 18 to swing unit 16 as shown in FIG. 2. Second end 22 of anti-swing latch 18 is formed to include a slot 136 and fore U-shaped swing arm 54 is situated within slot 136 to connect anti-swing latch 18 to swing unit 16. Anti-swing latch 18 also includes a finger tab 138 for a user to grab when moving anti-swing latch 16.

As discussed earlier, child carrier 10 may be configured in the stroller position, as shown in FIG. 1, or the carriage position as shown in FIGS. 9 and 10. Several components of seat 14 are adjusted to move child carrier 10 between the stroller and carriage positions.

Seat back 38 is movable about a seat back rotation axis 140 between a plurality of positions relative to seat bottom 40. Seat 12 includes a movable release bar 142 situated adjacent to seat back 38 and first and second seat back orientation devices 144, 146 as shown in FIGS. 5, 6, and 12.

Movable release bar 142 includes a grip portion 148, a locking bar 150, and first and second connection bars 152, 154 extending between and connecting grip portion 148 and locking bar 150 as shown in FIGS. 5 and 12.

First seat back orientation device 144 is situated on left side 58 of child carrier 10 and second seat back orientation device 146 is situated on right side 60 of child carrier 10. Each of the first and second seat back orientation devices 144, 146 are connected to seat back frame 42 and seat bottom frame 44 and are formed to include a curved slot 156 having four notches 158 as shown in FIG. 6. Locking bar 150 includes a first end 160 situated to lie in curved slot 156 of first seat back orientation device 144 and a second end 162 situated to lie in curved slot 156 of second seat back orientation device 146 as shown in FIGS. 5 and 6. A first spring 164 is connected to first end 160 of locking bar 150 to bias first end 160 of locking bar 150 into one of notches 158 of first seat back orientation device 144 and a second spring 166 is connected to second end 162 of locking bar 150 to bias second end 162 of locking bar 150 into a notch 158 of second seat back orientation device 146.

To adjust the orientation of seat back 38 relative to seat bottom 40, a user grabs grip portion 148 of movable release bar 142 and pulls upwardly in direction 168 away from seat bottom 40 until locking bar 150 disengages from the notch 158 that it is lying within. Once locking bar 150 disengages notch 158, the user can rotate seat back 38 about seat back rotation axis 140 to the desired location relative to seat bottom 40 and release grip portion 148 to permit first and second springs 164, 166 to bias first and second ends 160, 162 of locking bar 150 into a different notch 158. Seat back 38 may be oriented in four different positions relative to seat bottom 40 by using movable release bar 142 to situate first and second ends 160, 162 of locking bar 150 in one of the four notches 158 of seat back orientation devices 144, 146. Seat back 38 may be situated to lie flat in the same plane as seat bottom 40 as shown, for example, in FIGS. 9 and 10 or in one of three upright positions relative to seat bottom 40 as shown, for example, in FIGS. 1 and 2. Seat back 38 is moved relative to seat bottom 40 when seat 14 is adjusted between the stroller position, shown in FIG. 1, and the carriage position shown in FIGS. 9 and 10.

Extendible front bar 46 is another component of seat 14 that may move when child carrier 10 is adjusted between the stroller position and carriage position. Seat bottom 40 includes a seat bottom portion 170 and spaced-apart first and second side walls 172, 174 having a lower end 176 connected to seat bottom portion 170 and an upper end 178 spaced apart from lower end 176. Seat bottom frame 44 includes a first front bar housing 180 extending along upper end 178 of first side wall 172 and a second front bar housing 182 extending along upper end 178 of second side wall 174 as shown in FIGS. 7–9. Extendible front bar 46 includes a restraining portion 184 and first and second extension portions 186, 188 appended to restraining portion 184 and configured to extend into first and second front bar housings 180, 182 as shown in FIGS. 7 and 8.

Seat 14 further includes identical first and second front bar release mechanisms 190, 192 connected to first and second front bar housings 180, 182, respectively, as shown in FIGS. 7 and 8. First and second extension portions 186, 188 are formed to include apertures 194 spaced along the length of first and second extension portions 186, 188. Front bar release mechanisms 190, 192 include a detent 196 sized to extend into one of apertures 194 formed in first and second extension portions 186, 188, a finger tab 198 configured to rotate detent 196 about a front bar release mechanism rotation axis 210, and a spring 212 configured to bias detent 196 into one of apertures 194 as shown in FIGS. 7 and 8.

When a child caregiver wants to move extendible front bar 46 between one of its extended positions, shown in FIG. 7, and its retracted position, shown in FIG. 8, the child caregiver pushes on finger tabs 198 of first and second front bar release mechanisms 190, 192 in direction 214 to rotate detents 196 about front bar release mechanism rotation axis 210 and out of apertures 194 formed in first and second extension portions 186, 188 as shown in FIG. 7. Once detents 196 are removed from apertures 194, the child caregiver slides extendible front bar 46 relative to seat bottom 40 until the desired position of extendible front bar 46 is obtained and then releases finger tabs 198 to permit springs 212 to bias detents 196 about front bar release mechanism rotation axis 210 in direction 216 into one of apertures 194 formed in first and second extension portion 186, 188 as shown in FIG. 8.

Footrest 48 also moves when child carrier 10 is adjusted between its stroller position and carriage position. Footrest 48 includes an L-shaped footrest frame member 218 pivotably connected to seat bottom frame 44, first and second footrest guides 220 (only one shown) connected to L-shaped footrest frame member 218, and a U-shaped footrest position linkage 224. Footrest 48 may be situated in one of a lowered, downwardly-extending position, shown in FIG. 7, an upright position adjacent to extendible front bar 46, shown in FIG. 8, and an intermediate position shown in FIG. 19.

First and second footrest guides 220 are identical. First footrest guide 220 is situated on right side 60 of child carrier 10 and second footrest guide (not shown) is situated on left side 58 of child carrier 10. Each of first and second footrest guides 220 are formed to include a slot 226 having first and second ends 228, 230 and being sized to receive U-shaped footrest position linkage 224. Footrest guides 220 further include a detent 232 extending into slot 226 between first and second ends 228, 230 of slot 226 as shown in FIGS. 7 and 8. Detent 232 includes an angled flat side wall 234 facing toward second end 230 of slot 226 and a C-shaped side wall 236 facing toward first end 228 of slot 226.

Footrest position linkage 224 travels through slots 226 formed in footrest guides 220 as footrest 48 moves between its lowered position, intermediate position, and upright position. More importantly, footrest position linkage 224 and footrest guides 220 interact to control the movement of footrest 48. When footrest 48 is in its lowered, downwardly-extending position, footrest position linkage 224 is situated adjacent to second end 230 of slots 226 formed in footrest guides 220 to maintain footrest 48 in its lowered position as shown in FIG. 7. When footrest 48 is in its intermediate position, footrest position linkage abuts C-shaped sidewall 236 of detent 232 of footrest guides 220 to maintain footrest 48 in its intermediate position. When footrest 48 is in its upright position, footrest position linkage 224 is situated close to first end 228 of slot 226 as shown in FIG. 8. Footrest 48 is held in its upright position by extendible front bar 46 in its retracted position.

To move footrest 48 to its upright position, footrest 48 is folded upwardly in direction 238 toward its upright position while extendible front bar 46 is in one of its extended positions. Once footrest 48 is situated in its upright position, extendible front bar 46 is moved to its retracted position to engage and retain footrest 48 in its upright position.

Child carrier 10 is shown in its carriage position in FIGS. 9 and 10. To adjust child carrier 10 to its carriage position, seat back 38 is moved to its lowered position to lie in the same plane as seat bottom 40, extendible front bar 46 is moved to its retracted position, and footrest 48 is moved to its upright position as shown in FIGS. 9 and 10. To adjust child carrier 10 from its carriage position to its stroller position, shown in FIG. 1, seat back 38 is moved to one of its upright positions to lie upright relative to seat bottom 40, footrest 48 is moved to its lowered, downwardly-extending position, and extendible front bar 46 may be moved to one of its extended positions depending on the size of the child sitting in child carrier 10.

Seat 14 further includes a back end 237 situated adjacent to push bar 24 and a front end 239 spaced apart from back end 237 as shown in FIGS. 1, 9, and 10. In the stroller position, front end 239 of seat 14 is open to permit a toddler's legs to extend out of the opened front end 239 as shown in FIG. 1. In the carriage position, front end 239 of seat 14 is closed so that an infant lying in seat 14 will not fall out of seat 14.

Seat locking device 76 permits seat 14 to be removed from first and second seat-coupling bars 50, 52 as shown in FIGS. 13–17. Once seat 14 is removed from seat-coupling bars 50, 52, seat 14 can be used as a stand-alone bassinet as shown in FIG. 11. Seat 14 further includes a stabilizing bar 32 pivotably connected to seat back frame 42 as shown in FIGS. 5, 11, and 12. Stabilizing bar 42 is rotated away from seat back 38 when seat 14 is removed from seat-coupling bars 50, 52 to stabilize and support seat 14 as shown in FIG. 11.

Seat locking device 76 includes a first rotatable pin-retaining device 240 and a first actuator 242 connected to seat-coupling bar 50, a second rotatable pin-retaining device 244 and a second actuator 246 connected to second seat-coupling bar 52, and a rod 248 rotatably coupling first and second pin-retaining devices 240, 244 and first and second actuators 242, 246 as shown in FIGS. 11 and 13–17. Rod 248 extends substantially parallel to third arm portions 90 of fore and rear U-shaped swing arms 54, 56 as shown in FIG. 11. Rod 248 is situated close enough to rear U-shaped swing arm 56 that when a child caregiver moves rear U-shaped swing arm 56 between first and second rear swing arm lower attachment locations 128, 130 within rear swing arm adjustment slot 110, the child caregiver may use rod 248 to help move rear U-shaped swing arm 56.

First and second pin-retaining devices 240, 244 are rotatable about a seat locking device rotation axis 252 between a seat-locking position and a seat-unlocking position. Each of first and second rotatable pin-retaining devices 240, 244 includes an arm 250 and a stop face 251. In the seat-locking position, arm 250 closes open end 74 of second seat attachment pin-receiving slots 72 formed in seat-coupling bars 50, 52 to trap and retain a seat attachment pin 62, 64, 66, 68 within each of second seat attachment pin-receiving slots 72 as shown in FIGS. 13 and 14. Seat coupling bars 50, 52 further include a post 253 extending inwardly toward seat 14. Stop face 251 of pin-retaining devices 240, 244 engages post 253 when pin-retaining devices 240, 244 are in the seat-locking position as shown in FIGS. 13, 14, 16, and 17.

Figure 29:
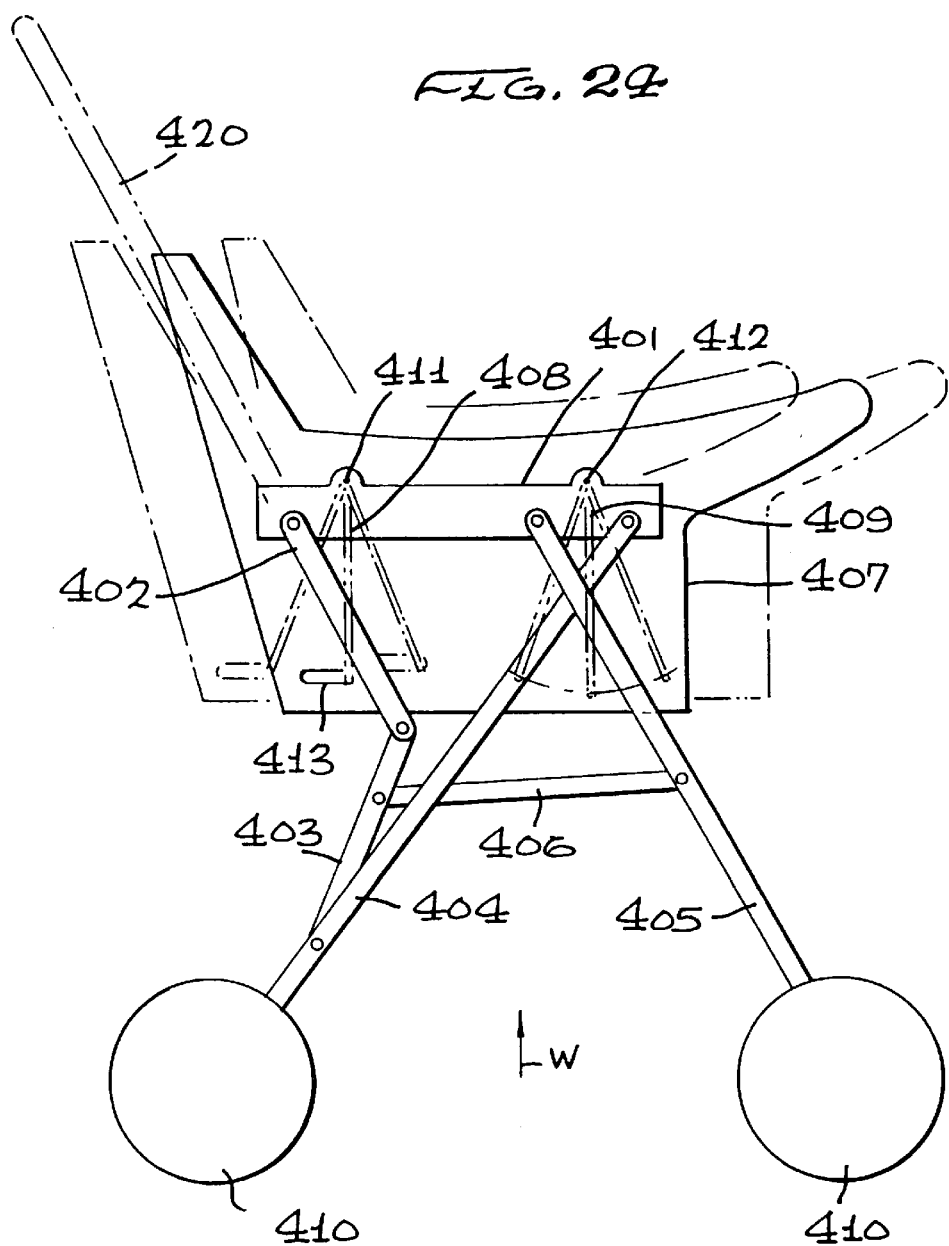
FIG. 29 is a partial side elevational view similar to FIG. 28 showing the frame having a rear leg and a latching hook pivotably connected to the rear leg and capable of coupling the frame and swing unit so that the swing unit may not move relative to the frame.
Figure 28:
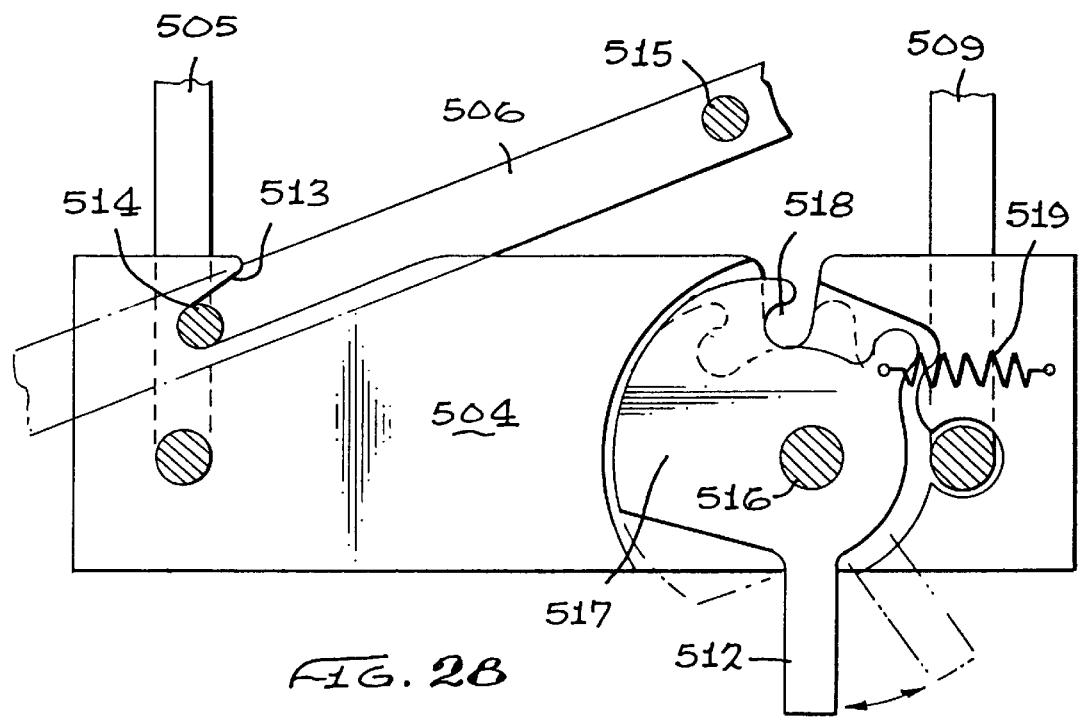
FIG. 28 is a partial side elevational view of the child carrier of FIG. 26 showing a portion of a seat frame having spaced-apart pins, the swing unit including a front rocking bar, a rear rocking bar, and a seat base connected to the front and rear rocking bars, the seat base being formed to include slots to receive the pins of the seat frame, and a locking connection bar connected to the seat base and movable between a pin-retaining position (solid lines) and a pin-releasing position (phantom lines)
Figure 29:
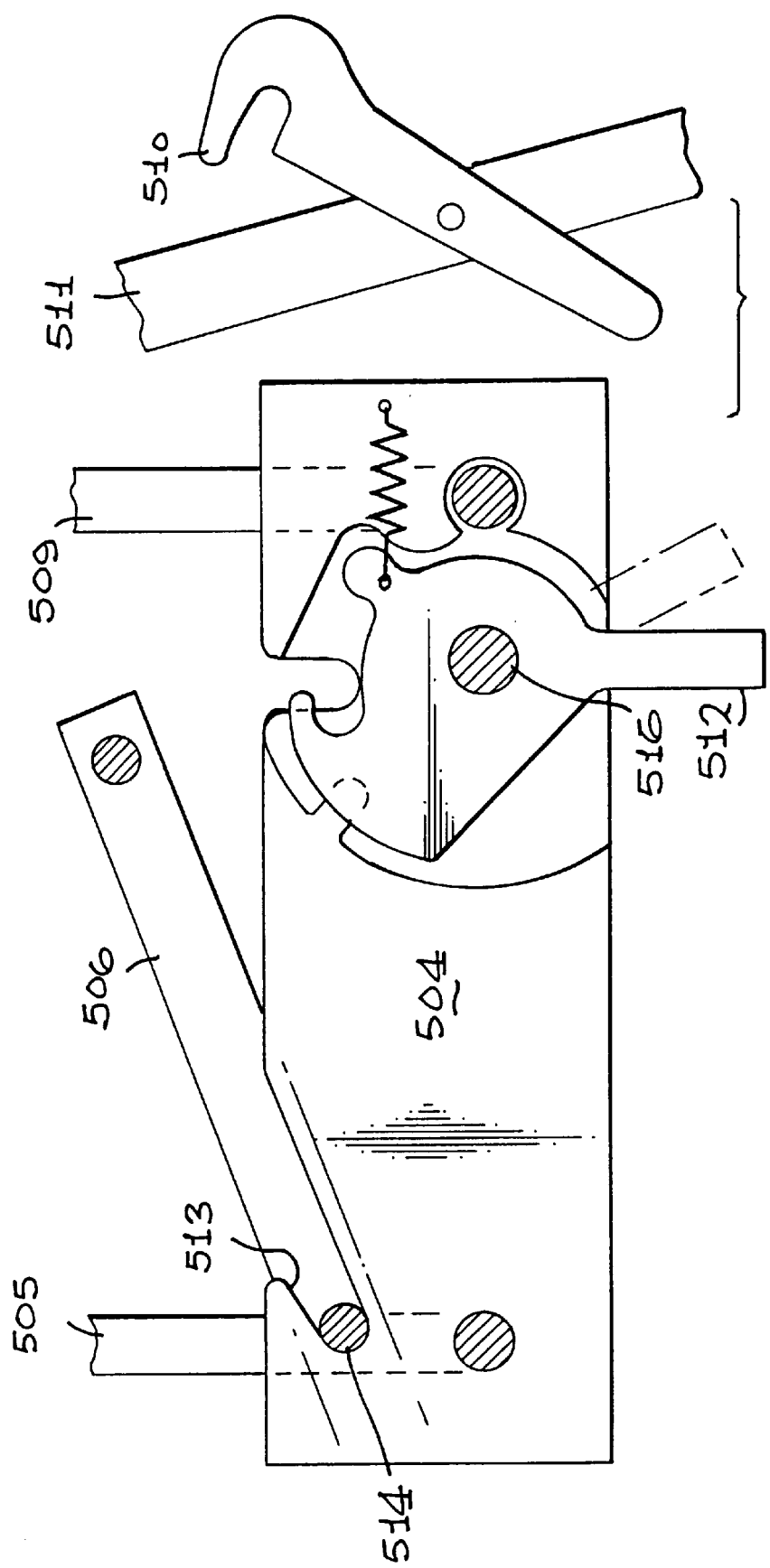

To remove seat 14 from seat-coupling bars 50, 52, a user rotates either first or second actuator 242, 246 about seat-locking device rotation axis 252 to rotate first and second pin-retaining devices 240, 244 so that arms 250 of pin-retaining devices 240, 244 no longer block open end 74 of second seat attachment pin-receiving slots 72 formed in seat-coupling bars 50, 52 as shown in FIG. 15. Next, a user lifts second and fourth seat attachment pins 64, 68 out of second seat attachment pin-receiving slots 72 formed in seat-coupling bars 50, 52 in direction 255 as shown in FIG. 16. Finally, a user lifts first and third seat attachment pins 62, 66 out of first seat attachment pin-receiving slots 70 formed in seat-coupling bars 50, 52 in direction 259 as shown in FIG. 17. To reconnect seat 14 to seat-coupling bars 50, 52, the child caregiver need only insert seat attachment pins 62, 64, 66, 68, into seat attachment pin-receiving slots 70, 72 and push down on seat attachment pins 62, 64, 66, 68 until pin-retaining devices 240, 244 rotate about seat-locking rotation axis 252 so that arms 250 of pin-retaining devices 240, 244 no longer block open end 74 of second seat attachment pin-receiving slots 72 and seat attachment pins 62, 64, 66, 68 can slide into seat attachment pin-receiving slots 70, 72. Arms 250 of pin-retaining devices 240, 244 include a tapered top side 261, and a curved bottom side 263 as shown, for example, in FIGS. 17 and 17A. When seat attachment pins 62, 64, 66, 68 engage tapered top side 263 of arms 250, the seat attachment pins 62, 64, 66, 68 act on pin-retaining devices 240, 244 to force pin-retaining devices 240, 244 to rotate about seat-locking rotation axis 252 so that arms 250 of pin-retaining devices 240, 244 no longer block open end 74 of second seat attachment pin-receiving slots 72. Seat locking device 76 further includes a spring device that biases pin-retaining devices 240, 244 toward the seat-locking position. A similar spring device is illustrated and disclosed in Chinese Patent Application Serial No. 96205575.1 filed Mar. 4, 1996. This spring device disclosed in Chinese Patent Application Serial No. 96205575.1 is illustrated in FIGS. 28 and 29 of the present application.

Each of pin-retaining devices 240, 244 are formed to include a slot 265 defined by bottom side 263 of arms 250 and a side wall 267 extending substantially parallel to bottom side 263 as shown, for example, in FIG. 17A. Seat attachment pins 62, 64, 66, 68 are situated in slot 265 when pins 62, 64, 66, 68 are trapped by arms 240 in pin-receiving slots 70, 72 of seat coupling bars 50, 51. The bottom side 263 of arms 250 and side wall 267 are curved about a radial distance 269, 271, respectively, from seat-locking device rotation axis 252 as shown in FIG. 17A. The distance between bottom side 263 of arms 250 and side wall 267 is approximately equal to the diameter 273 of pins 62, 64, 66, 68.

Seat 14 can be connected to seat-coupling bars 50, 52 so that seat 14 faces rearward toward push bar 24 as shown, for example, in FIG. 18 or forward away from push bar 24 as shown in FIGS. 1 and 9–12. Seat 14 is positioned to face forward away from push bar 24 by situating first and third seat attachment pins 62, 66 in first seat attachment pin-receiving slots 70 and second and fourth seat attachment pins 64, 68 in second seat attachment pin-receiving slots 72. Seat 14 is positioned to face rearward toward push bar 24 by situating second and fourth seat attachment pins 64, 68 in first seat attachment pin-receiving slots 70 and first and third seat attachment pins 62, 66 in second seat attachment pin-receiving slots 72.

When the child caregiver is finished using child carrier 10, child carrier 10 can be folded into a collapsed position so that child carrier 10 may be stored in a closet or vehicle more easily as shown in FIGS. 20 and 21. Child carrier 10 includes first and second frame housings 254, 256 connected to and covering portions of fore legs 26, rear legs 28, and push bar 24, a first child carrier folding device 257 situated within and connected to first frame housing 254, and a second child carrier folding device 258 situated within and connected to second frame housing 256 shown in FIGS. 22 and 23. First frame housing 254 is situated on left frame side 78 and second frame housing 256 is situated on right frame side 80. Each of frame housings 254, 256 includes a first frame section 260 connected to push bar 24 and a second frame section 262 connected to fore legs 26.

First and second child carrier folding devices 257, 258 are identical. Child carrier folding devices 257, 258 are connected to first frame section 260 and second frame section 262 is formed to include a notch 264 sized to receive a portion of child carrier folding device 257, 258.

Figure 22:
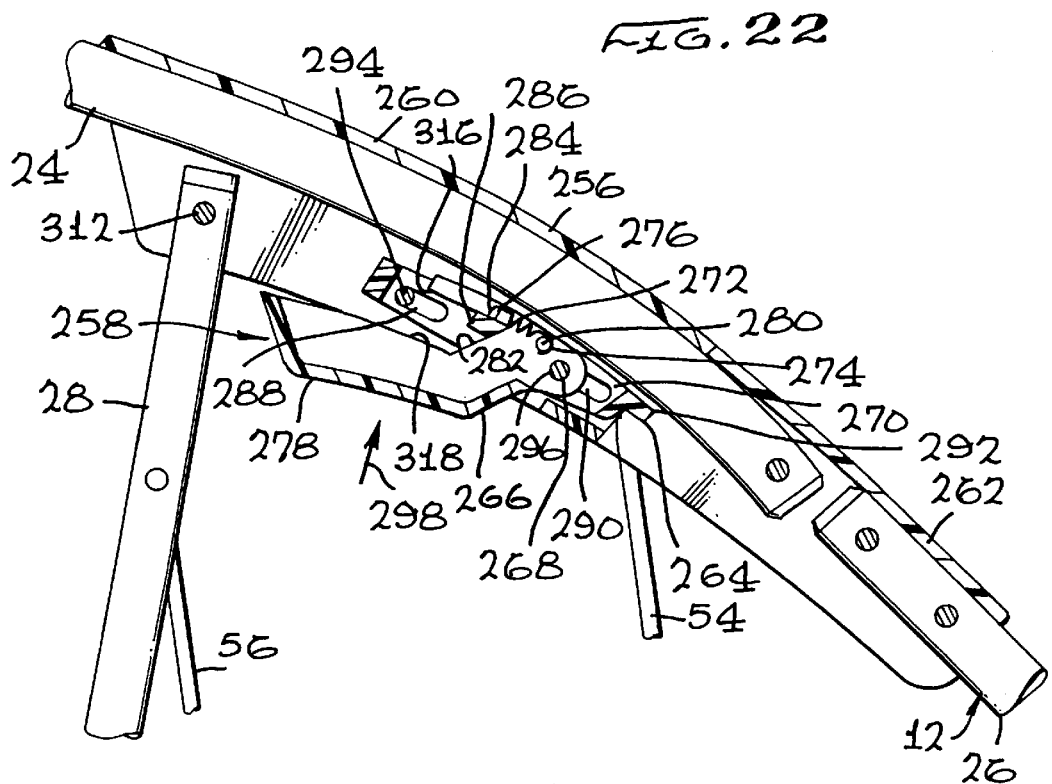
FIGS. 22 and 23 are partial side elevational views of a child carrier folding device situated within a folding device housing having a first housing section connected to a first frame section and a second housing section connected to a second frame section, the child carrier folding device permitting a user to fold the child carrier to its collapsed folding position shown in FIG. 21.
Figure 23:
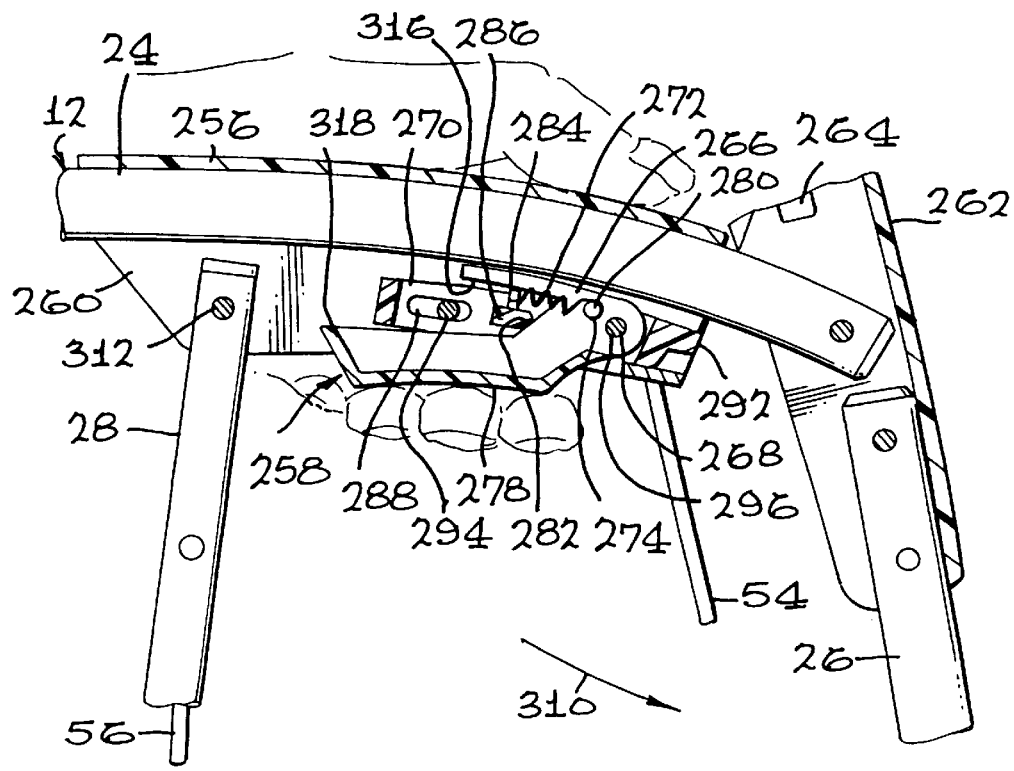

Child carrier folding devices 257, 258 include a rotatable body 266 rotatable about a child carrier folding device rotation axis 268, a slidable latch 270 connected to rotatable body 266, and a spring 272 having a first end 274 connected to rotatable body 266 and a second end 276 connected to slidable latch 270 as shown in FIGS. 22 and 23. Rotatable body 266 includes a finger grip 278, a post 280 connected to first end 274 of spring 272, and an inclined wall 282. Slidable latch 270 includes a post 284 connected to second end 276 of spring 272, a yoke 286 connected to post 284 and arranged to engage inclined side wall 282 of rotatable body 266, first and second slots 288, 290, and a detent 292 configured to fit within notch 264 formed in second frame section 262.

Child carrier folding device 257, 258 further includes first and second pegs 294, 296 connected to first frame section 260. First peg 294 extends through first slot 288 formed in slidable latch 270 and second peg 296 extends through second slot 290 formed in slidable latch 270 and is connected to rotatable body 266.

When child carrier 10 is in its unfolded position, detent 292 of slidable latch 270 is situated within notch 264 formed in second frame section 262 to lock child carrier 10 in its unfolded position. To fold child carrier 10, a child caregiver grasps finger grip 278 of rotatable body 266 and presses upward in direction 298 as shown in FIG. 22. Pressing upward on finger grip 278 causes yoke 286 of slidable latch 270 to ride downward on inclined wall 282 of rotatable body 266. As yoke 286 rides downward on inclined wall 282, slidable latch 270 moves away from second frame section 262 so that detent 292 of slidable latch 270 is no longer situated in notch 264 and push bar 24 may be folded relative to fore legs 26 in direction 310 as shown in FIGS. 20 and 23.

Other connections such as the connection between rear legs 28 and frame housing 32 at point 312 are pivotable connections so that child carrier 10 is permitted to fold into a compact folded position as shown in FIGS. 20 and 21. Child carrier 10 further includes a locking latch 314 that is configured to extend between and connect rear legs 28 and fore legs 26 when child carrier 10 is in its folded position to maintain child carrier 10 in its folded position as shown in FIG. 21. To place child carrier 10 in its unfolded position from its unfolded position, a child caregiver may place their foot on one of cross braces 30 of frame 12 and pull upward on push bar 24 until detent 292 of slidable latch 270 "snaps" into notch 264 formed in second frame section 262. Rotatable body 266 further includes spaced-apart retaining walls 316, 318 that limit the movement of rotatable body 266 relative to slidable latch 270.

Embodiment 2

Another example in accordance with the present invention is a baby carrier which has a pair of swing arms, a fore swing arm and a back swing arm. The upper ends of the swing arms are pivotally connected to the frame of the carrier at fixed positions; preferably, the fore swing arm is pivotally connected to the front of the frame and the back swing arm is pivotally connected to the rear of the frame. The lower ends of the swing arms can swing transversely along the frame. A seat, or a support structure for a seat, is movably joined to the lower ends of the swing arms. Owing to the seat or the support structure being in suspension on the fore and rear swing arms, the seat or the support structure is capable of rocking or gliding with the lower ends of the swing arms to simulate the action of a cradle. The child carrier may also be called a baby carriage.

In a preferred embodiment, a support structure for a seat is used and a detachable seat can be put on and removed from the support structure. In an example, a first locking device is provided to secure the detachable seat to the support structure. In a further preferred embodiment, the detachable seat can be positioned either forward or rear-facing on the support structure.

In another preferred embodiment, a second locking device is provided which when engaged will keep the lower ends of the swing arms from rocking or gliding. Such a locking device is easily disengaged by an operator to free the lower ends of the swing arms. In an example, the second locking device locks the seat or the support structure for a seat to the frame when engaged. When the locking mechanism is engaged, the carriage of the present invention is used as a common hand-pushed baby carriage.

In yet another preferred embodiment, a distance adjusting device is provided in the seat or the support structure for a seat. This device allows an operator to adjust the distance between the lower ends of the swing arms so as to change the movement of the seat or the support structure from gliding to rocking, and vice versa. In an example, an adjusting long slot is provided in the seat or the support structure for a seat for a swing arm. A plurality of positions are provided along the adjusting long slot for positioning the lower end of the swing arm.

An embodiment is described below with reference to FIGS. 24 and 25, which includes the following parts:

Cross beam (401); bracing diagonal (402); folding connections (403); rear legs (404); fore legs (405);
connecting rods (406); seat (407); rear swing arm (408); fore swing arm (409); wheels (410); cross beam rear hole (411); cross beam fore hole (412);
long adjustment slot (413); pivot (414); push-and-pull handle (415); long slot (416); locking rod moving handle (417); locking rods (418); and hand push bar (420).

Referring to FIG. 24, the frame is transversely symmetric. The frame includes cross beams 401, fore legs 405, connecting rods 406, rear legs 404, folding connections (connection members) 403, and bracing diagonals 402. The upper ends of said fore legs 405 and the rear legs 404 are movably joined to the fore portions of the cross beams 401. One end of the folding connections 403 is movably joined to the rear legs 404, the other end is movably joined to one end portion of the bracing diagonals 402. The other end portion of the bracing diagonals 402 is movably joined to the rear portion of the cross beams 401. One end of the connecting rods 406 is movably joined to the fore legs 405, the other end of the connecting rods 406 is movably joined to the folding connections 403.

In an alternative to the mode as shown in FIG. 24, the upper end portions of said fore legs 405 and rear legs 404 can be joined to the cross beams 401 with the end portion of the fore legs 405 in the front, and the end portion of the rear legs 404 in the rear. In another alternative, the end portions of the fore legs 405 and the rear legs 404 can be hinged at the same position on the cross beams 401. In other alternatives, the upper end portions of the fore legs 405 can be hinged to the upper portions of the rear legs 404 while the ends of the rear legs 404 are hinged to the cross beams 401, or the upper end portions of the fore legs 405 are hinged to the cross beams 401 while the upper portions of the rear legs 404 are hinged to the upper portions of the fore legs 405. The above-mentioned changeovers of position of the upper end portions of the fore legs 405 and the rear legs 404 all belong to an equivalent replacement.

The wheels 410 are respectively disposed at the lower portions of the fore legs 405 and the rear legs 404. The hand-pushed bar 420 is joined to the bracing diagonals 402.

The fore swing arm 409 and the rear swing arm 408 are hinged on the cross beams 401 of the frame through the cross beam fore hole 412 and the cross beam rear hole 411, respectively. Other modes of movable joining are also possible. For instance, the upper portion of the rear swing arm 408 or fore swing arm 409 is again hinged to the end of a section of the connecting rod, the upper end portion of the connecting rod is again hinged to the cross beam 401; on the exterior of the cross beams 401 is provided a protecting hood, said protecting hood is used to cover the hinges of the cross beams to insure the safety of the baby on the seat 407.

In another example, in the front and rear of the frame are respectively hinged the fore swing arm 409 and the rear swing arm 408, the lower ends of said fore swing arm 409 and rear swing arm 408 are respectively movably joined to the bottom portion or the lower portion of the seat 407.

The state of the seat 407, when being able to be rocked forward and backward, is shown by double dotted lines in FIG. 24.

At the lower end portions of said fore swing arm 409 and rear swing arm 408 is provided a distance adjusting device. Generally, when the fore and rear swing arms are parallel to each other, the seat 407 makes approximate horizontal motion (i.e. gliding). By increasing the distance between the lower end portions of the fore swing arm 409 and rear swing arm 408, the fore and rear swing arms will be in the shape of a trapezoid which enables the seat 407 to change from horizontal gliding to an approximate pendulum type rocking.

Said distance adjustment is made possible by an adjusting long slot 413 in the forward and backward direction provided at the bottom portion or lower portion of the rear end of said seat 407 for the back and forth gliding. The lower end of the rear swing arm 408 passing through the adjusting long slot 413 is used to support the rear portion of the seat 407. The lower end of the fore swing arm 409, movably joined (for instance, a hinge joint is used in FIG. 24) to the bottom portion or lower bottom portion of the front end of the seat 407, is used to support the front portion of the seat 407. The backward and forward gliding of the lower portion of the rear swing arm 408 in the adjusting long slot 413 can adjust the distance between the lower portions of the fore and rear swing arms. The long adjusting slot can also be provided on the seat 407 at both lower portions of the fore swing arm 409 and rear swing arm 408 to allow simultaneously adjusting the distance between the lower portions of the fore swing arm 409 and rear swing arm 408.

A distance adjusting device is described in Chinese Utility Model Application No. 94242511.1, incorporated by reference herein. The distance adjusting device can also be provided at the upper ends of the fore swing arm and the rear swing arm for adjusting the distance between the upper end portions of the fore and rear swing arms.

Figure 25:
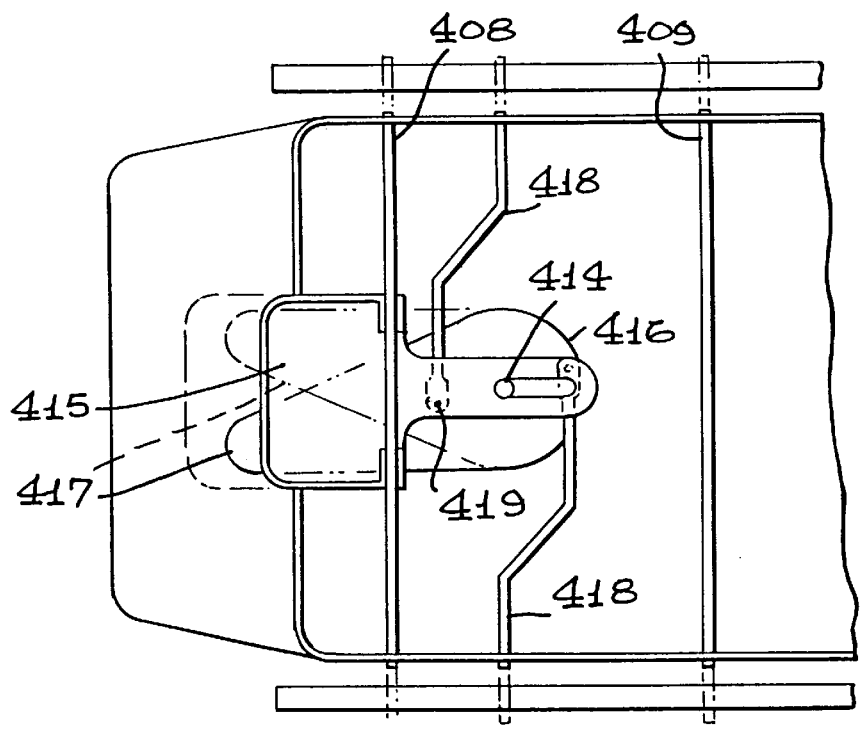
FIG. 25 is bottom plan view of the seat of the child carrier of FIG. 24, with portions cutaway, showing a locking device used to couple the seat to the frame.

Referring to FIG. 25, at the bottom portion of said seat 407 is provided a push-and-pull handle 415. The rear portion of the push-and-pull handle 415 is joined to the rear swing arm 408. The fore portion of the push-and-pull handle 415 is movably joined on the pivot 414 of the bottom of the seat 407. By pushing and pulling of the push-and-pull handle 415, the rear swing arm 408 is made to slide in the adjusting long slot 413 to locate respectively at position I or position II in FIG. 24, thereby adjusting the distance between the lower end portions of the fore and rear swing arms.

When moving back and forth, the push-and-pull handle 415 is also required to move relative to the pivot 414. Therefore, a long slot 416 is made on the push-and-pull handle at the junction of said push-and-pull handle 415 and the pivot 414 for the pivot 414 to be able to slide in the forward and backward direction. The pivot 414 passes through that long slot 416 to join the handle 415.

In order to make the rear swing arm 408 relatively stable in position I or II in the adjusting long slot 413, a damping device is provided between the pivot 414 and the slot wall of the long slot 416. Namely the slot width at both end portions of the long slot 416 is slightly larger than the diameter of the pivot 414 while the slot width in the middle portion of the long slot 416 is slightly less than the diameter of the pivot 414. A parallel stripe slot is provided adjacent to the long slot 416 to make the slot wall of long slot 416 have elasticity such that the elasticity of the long slot 416 wall is utilized to tightly press the pivot 414 and to prevent it from gliding during the rocking of the seat 407. That damping device can also be provided in the long adjusting slot 413.

A locking device is provided between said seat 407 and the frame, namely a locking rod moving handle 417 joined to said pivot 414. The locking rod moving handle 417 is able to swivel around said pivot 414. Two transverse locking rods 418 are hinged respectively on the locking rod moving handle 417 along the fore and rear positions of the pivot 414, the outer end point of these two locking rods are aligned with the locating holes on the two sides of the frame. The lateral moving of the locking rod moving handle 417 can either insert the locking rods 418 into the locating holes or pull them out of the locating holes, thereby locking or unlocking the seat 407 relative to the frame.

Embodiment 3

A third exemplary child carrier in accordance with the present invention is constructed so that the two side supports are connected by a horizontal connecting rod, and the side support is such that the front part of the front supporting rod is flexibly connected to the upper part of the front leg, and a locking device is arranged where they are connected; the rear part of the front supporting rod is flexibly connected to the upper part of the rear leg; a basket frame is hinged to the front leg and the rear leg; the wheels are arranged on the front and rear legs; the push bar is connected to the front supporting rod; the upper end of the front rocking bar is pivotally connected to the front supporting rod or the front leg, while the upper end of the rear rocking bar is pivotally connected to the front supporting rod or the rear leg; and the lower parts of said front rocking bar and rear rocking bar are movably connected to the lower parts of the seat.

This child carrier includes the following features:

(1) The body frame, consisting of the front leg, the front supporting rod, the rear leg, and the basket frame is simple in structure. When unfolded, the body frame exhibits a stable triangular structure; when folded from the position shown in FIG. 28, its front leg rotates in the counterclockwise direction while its front supporting rod rotates in the clockwise direction, so that the body frame can be folded upward and downward, which is convenient for a user with a child held in one hand to operate.

(2) The front rocking bar and the rear rocking bar can be rocked back and forth so that the seat can be moved like a cradle.

The following is a further description of the present child carrier in association with FIGS. 26–32:

(501) wheels; (502) front leg; (503) basket frame;
(504) seat base; (505) front rocking bar; (506) seat frame; (507) front supporting rod; (508) pushing bar; (509) rear rocking bar; (510) latching hook;
(511) rear leg; (512) locking connecting bar; (513) retaining slot; (514) pin; (515) pin; (516) pin;
(517) catch; (518) retaining slot; (519) spring;
(520) handle; (521) return spring; (522) tension spring; (523) tab; (524) incline; (525) incline;
(526) long groove; (527) pin; (528) pin; (529) return spring; (530) rotating shaft; (531) slide block; (532) hasp; (533) return spring.

The two sides of the frame are connected through a horizontal connecting bar. Of the side supports, the front part of front supporting rod (507) and the upper part of the front leg (502) are flexibly connected; and there is a locking device arranged where they are connected. The rear part of the front supporting rod (507) and the upper part of the rear leg (511) are pivotally connected. The basket frame (503) is hinged to the front leg (502) and rear leg (511). The wheels (501) are arranged on the front leg (502) and the rear leg (511). The push bar (508) and the front supporting rod (507) are connected. The upper end of the front rocking bar (505) is pivotally connected to the front supporting rod (507) or the front leg (502), while the upper end of the rear rocking bar (509) is pivotally connected to the front supporting rod (507) or the rear leg (511). The lower parts of the aforementioned front rocking bar (505) and the aforementioned rear rocking bar (509) are movably connected to the seat.

A distance adjusting device is arranged between the upper or lower ends of the aforementioned front rocking bar (505) and the aforementioned rear rocking bar (509). The distance adjusting device is a long groove for adjustment at the rear of the seat which is for the rear rocking bar (509) to slide forward and backward, and the lower end of the rear rocking bar (509) is located inside said long groove for adjustment, and the lower end of said front rocking bar (505) is connected to the front part of the seat so as to support the front part of the seat. Alternatively, the distance adjusting device is a long groove for adjustment at the front of the seat which is for the front rocking bar (505) to slide forward and backward, and the lower end of the front rocking bar (505) is located inside said long groove for adjustment, and the lower end of the rear rocking bar (509) is connected to the rear part of the seat so as to support the rear part of the seat. The long groove for adjustment is an elongated slot for back-and-forth movement which is open at the lower part of the seat.

There is a swivel joint on the elongated slot where the front rocking bar (505) or the rear rocking bar (509) passes through. At the swivel joint, the distance between the lower ends of the front and rear rocking bars is equal to the distance between the upper ends of the front and rear rocking bars.

There is an elastic device arranged on the upper or lower side of the elongated slot. The elastic device has an open groove on the long strip groove neighboring the wall, and the elongated slot wall between the elongated slot and the neighboring strip groove is elastic. The lower parts of the front rocking bar (505) and the rear rocking bar (509) are movably connected to the lower parts of the seat.

A basket is arranged beneath said basket frame (503).

The rear rocking bar (509) is U-shaped, with its upper ends pivotally connected to the rear parts of the two side support frames, while its lower ends pass through the seat and are horizontally connected in the form of a cross bar under the seat. The front rocking bar (505) is U-shaped, with its upper ends pivotally connected to the front parts of the two side support frames, while its lower ends pass through the seat and are horizontally connected in the form of a cross bar under the seat. For the rear rocking bar (509) arranged in front of the cross bar under the seat there is also a horizontal bar which is connected to the seat. The long groove for adjustment is located on the seat base (504). The horizontal bar set in front of the rear rocking bar for horizontal connection to the seat is a horizontal bar connecting catches (517) on either side. The front rocking bar (505) or rear rocking bar (509) can comprise a number of rods which are joined together (e.g. in a chain), or it may comprise a rod in a single piece, or a flexible rod (such as a cable); the rocking bar referred to in the present patent can be not only a rigid rod but also a flexible rod as described above.

Figure 26:
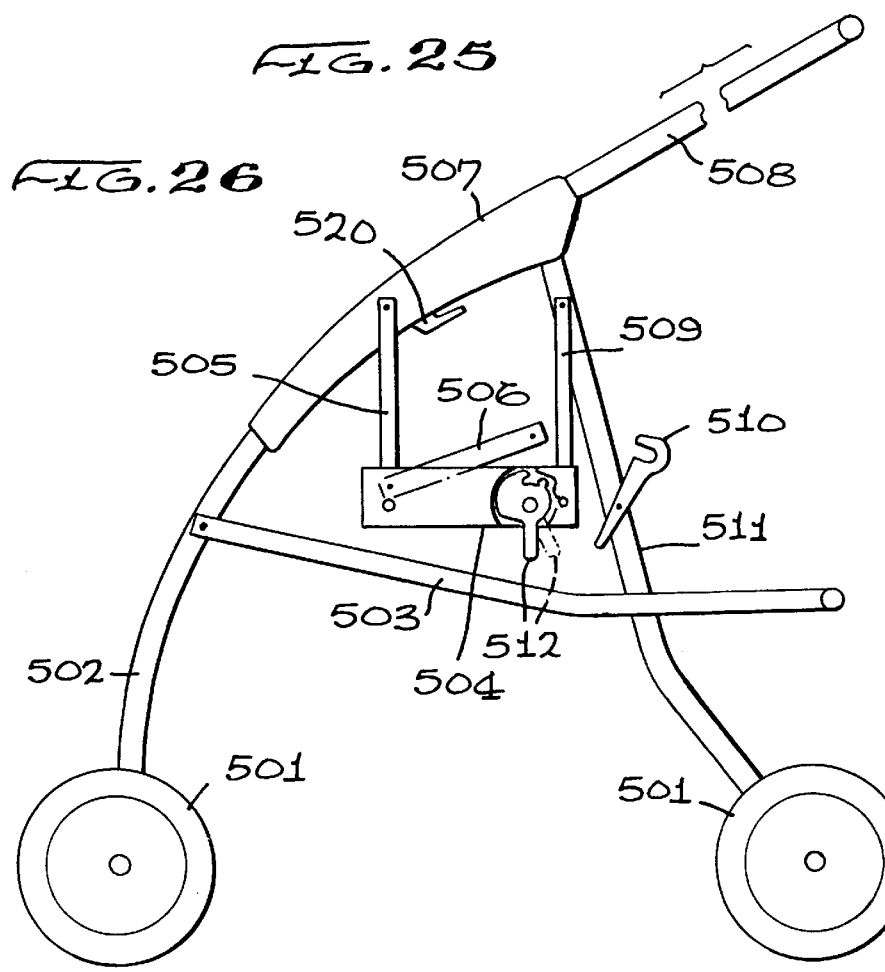
FIG. 26 is a side elevational view of a third embodiment of a child carrier according to the present invention showing the child carrier having a frame and a swing unit used to connect a seat (not shown) to the frame.
Figure 27:
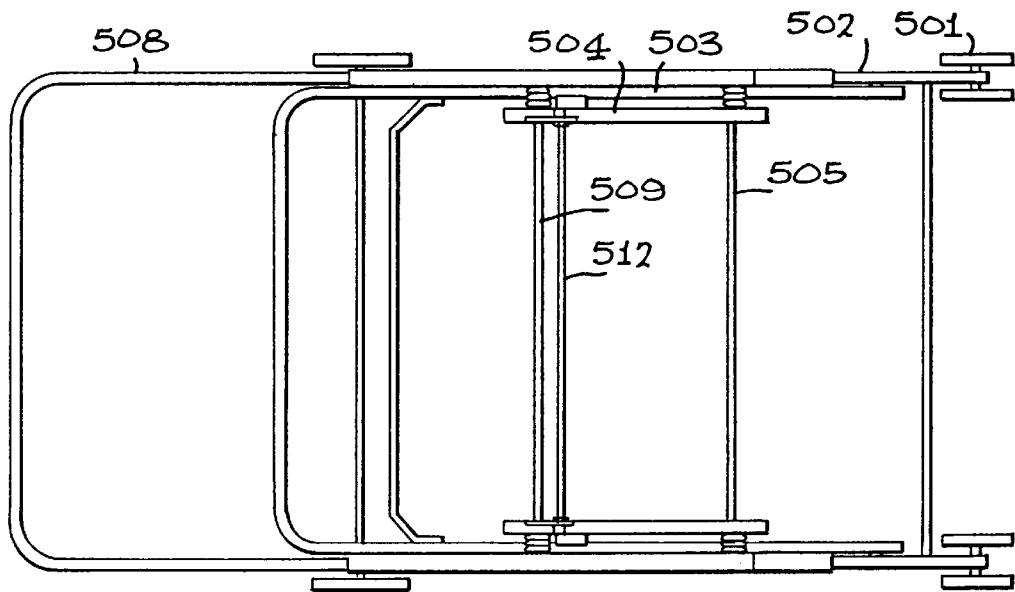
FIG. 27 is a top plan view of the child carrier of FIG. 26.

Refer to FIG. 26, the front end of the front supporting rod (507) of the present utility model is pivotally connected with the upper end of the front leg (502) (or it may be joined together with other flexible connections), and a locking device is arranged where they are connected.

Figure 32:
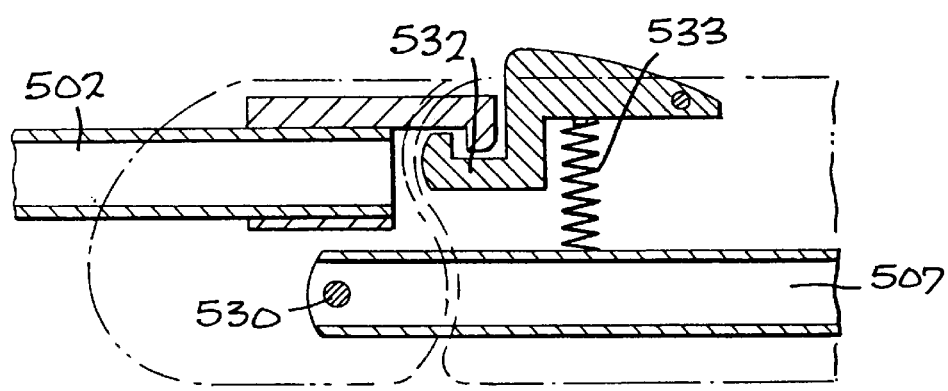

For the locking device, please refer to the three structures shown in FIG. 30, FIG. 31, and FIG. 32. In FIG. 30, the locking device arranged between the front leg (502) and the front supporting rod (507) includes a handle (520) with one end joined to the front supporting rod (507), a slide block (525) which is in contact with the incline of the handle (520), the tension spring (522) between the slide block and the front supporting rod (507), the return spring (521) between the handle (520) and the front supporting rod (507). A tab (523) is arranged in the front of the slide block. The tab (523) stays in the notch of the front leg (502). There is an incline (524) on the side of the notch.

When the handle (520) rotates counterclockwise against the pressure of the return spring (521), the incline (525) on the handle (520) pushes the slide block to slide against the force of the tension spring (522), and the tab (523) at the end of the slide block disengages from the notch of the front leg (502) so that the front leg (502) and the front supporting rod (507) can rotate and be folded. In the locked position, the tab (523) slides into the notch along the incline (524) on the front leg (502) so that the front leg (502) and the front supporting rod (507) are locked together.

FIG. 31 provides a structural view of another locking device, in which the front leg (502) and the front supporting rod (507) are not located along a straight line, and locking of the two is realized when the retaining slot (528) on the clamping slide block (531) which is connected to the front supporting rod (507) is stuck on the front leg (502). When the locking device is released, the clamping slide block (531) is pulled toward the right, so that the retaining slot (528) disengages from the end of the front leg (502) and the front supporting rod (507) rotates clockwise about the rotating shaft (530) to accomplish the folding motion.

FIG. 32 provides a third example of locking device. After the hasp (532) presses the return spring (533) and disengages from the front leg (502), the locking device is released, and the front supporting rod (507) rotates clockwise about the rotating shaft (530) to accomplish the folding motion. In FIG. 32 the front supporting rod (507) and the front leg (502) are also not located along a straight line.

Refer to FIG. 26, the basket frame (503) is hinged to the front leg (502) and rear leg (511), and a basket can be set on the basket frame (503). Wheels (501) are set on the front legs (502) and rear legs (511). The push bar (508) and the front supporting rod (507) are connected. The push bar (508) can be either of the folding type or the telescope zooming type, and the push bar (508) can also be connected indirectly to the front supporting rod (507).

The upper end of the front rocking bar (505) is pivotally connected to the front supporting rod (507) or the front leg (502), while the upper end of the rear rocking bar (509) is pivotally connected to the front supporting rod (507) or the rear leg (511), and the lower parts of said front rocking bar (505) and the rear rocking bar (509) are movably connected to the lower part of the seat; in this way the seat can be rocked back and forth. The front supporting rod (507) and the front leg (502) after connection forms a convex arc or a straight line. A triangular frame is formed by the front leg (502) in connection with the front supporting rod (507), the rear leg (511), and the basket frame (503). The triangular frame referred to here means triangular in the broad sense of the word, and the front leg (502) and the front supporting rod (507) can have an arched or linear shape, and it can also have a nonlinear connection as shown in FIG. 33 and FIG. 32. Here the connection formed by the front supporting rod (507) and the front leg (502) is always considered one side of the triangular frame. The seat includes the seat base (504) and the seat frame (506), where said seat base (504) is movably connected to the lower parts of the front rocking bar (505) and the rear rocking bar (509), the seat frame (506) is movably connected to the seat base (504), and a seat can be arranged on the seat frame.

Refer to FIG. 28 and FIG. 29, there is a retaining slot (513) and retaining slot (514) set in the front part and the rear part of the seat base (504), pin (514) and pin (515) are placed in the front part and the rear part of the seat frame (506), and the pin (514) is inserted in the retaining slot (513), and the pin (515) is inserted in the retaining slot (518). A locking device is arranged between said pin and retaining slot. The locking device includes a catch (517) which is connected with a pin joint to the seat base (504), and a spring (509), the two ends of which are connected to the seat base (504) and the catch (517). A diagonal retaining slot is arranged on the catch (517). The retaining slot is arranged on the pin of the seat frame (506). The two said side catches (517) are connected through a horizontal locking connecting bar (512) which passes through the bottom of the seat frame (506).

When the locking connection bar (512) is pulled counterclockwise, the diagonal retaining slot cut on the catch (517) disengages from the pin (515), and the seat frame (506) and the seat connected to the seat frame (506) can be taken off and removed from the stroller. The location where said front leg (502) and front supporting rod (507) are flexibly connected is between the point where the front supporting rod (507) and the rear leg (511) meet and the point where the front leg (502) and the basket frame (503) meet. There is a locking device arranged between the body frame comprising the front supporting rod (507), the front leg (502), the basket frame (503), and the rear leg (511) and the seat comprising the front rocking bar (505), the rear rocking bar (509), the seat base (504), and the seat frame (506).

FIG. 29 provides a locking device which comprises the latching hook (510) The locking device can include the latching hook (510) placed on the rear leg (511) or the front leg. The front hook part of said latching hook (510) hooks onto the seat base (504), and the latching hook in FIG. 29 hooks onto the horizontal bar of the rear rocking bar (509).

Although this invention has been described in detail with reference to certain embodiments, variations and modifications exist within the scope and spirit of the invention as described and defined in the following claims.

What is claimed is:

1. A child carrier comprising
   a frame,
   wheels disposed at the lower portion of said frame for travelling on a supporting surface,
   a handbar joined to said frame for manually pushing said frame,
   a seat linked to said frame,
   a swinging unit which is connected to said frame and said seat and supports said seat, and
   a locking device capable of locking said swinging unit into a fixed position with said frame and unlocking said swinging unit from said frame;
   wherein, upon unlocking said swinging unit from said frame, said swinging unit can be pushed by hand to swing transversely along said frame while said frame remains stationary relative to said supporting surface.

2. The child carrier of claim 1, wherein said swinging unit is capable of both rocking and gliding, and said swinging unit comprises a switching device which allows manually switching the swinging motion of said swinging unit from rocking to gliding, and vice versa.

3. The child carrier of claim 2, wherein said swinging unit comprises a fore swing arm and a rear swing arm each pivotally connected to said frame and said switching device comprises a distance adjustment device which switches the swinging motion of said swinging unit by adjusting the distance between said fore and rear swing arms.

4. The child carrier of claim 3, wherein said swinging unit glides back and forth horizontally when said fore and rear swing arms are parallel with each other.

5. The child carrier of claim 3, wherein said swinging unit rocks when said fore and rear swing arms diverge from or converge toward each other.

6. The child carrier of claim 3, wherein said seat is movably joined to said fore and rear swing arms.

7. The child carrier of claim 3, further comprising a seat-coupling bar connected to the fore and rear swing arms and linked to the seat, the seat-coupling bar comprises an aperture sized to receive one of the fore and rear swing arms and a swing arm adjustment slot configured to receive the other of the fore and rear swing arms and permit said other swing arm to travel through the swing arm adjustment slot between a plurality of positions so as to allow switching between rocking and gliding.

8. The child carrier of claim 7, wherein said seat-coupling bar further comprises a flexible tab having a first detent situated adjacent to one end of the swing arm adjustment slot and arranged to extend into the swing arm adjustment slot to define a swing arm attachment location, wherein when said other swing arm passes into the swing arm attachment location the tab flexes to permit said other swing arm to pass by the first detent.

9. The child carrier of claim 3, wherein said distance adjusting device comprises a swing arm adjustment slot provided at the lower portion of said seat in the forward and backward direction, the lower end of one of said fore and rear swing arms passes through that adjustment slot to support the seat and is capable of back and forth gliding along the swing arm adjustment slot, the lower end of the other one of the fore and rear swing arms is also joined to the lower portion of the seat to support the seat.

10. The child carrier of claim 9, wherein a push-and-pull handle is provided at the bottom portion of said seat, the rear portion of said push-and-pull handle is joined to the swing arm passing through the adjustment slot, the fore portion of said push-and-pull handle is movably joined to a pivot at the bottom portion of the seat.

11. The child carrier of claim 10, wherein a long slot is provided on the push-and-pull handle at the junction of said push-and-pull handle and pivot for the pivot to glide in the forward and backward direction, the pivot passes that long slot to join the push-and-pull handle, furthermore, a damping device is provided between the pivot and the wall of the long slot.

12. The child carrier of claim 11, wherein the slot width at both end portions of said long slot is slightly larger than the diameter of the pivot while the slot width in the middle portion of the long slot is slightly less than the diameter of the pivot, and a parallel stripe slot is provided adjacent to the long slot to make the slot wall of the long slot elastic.

13. The child carrier of claim 10, wherein said pivot is joined to a locking rod moving handle which is able to swivel around that pivot, on the locking rod moving handle in the front and rear of the pivot are hinged two transverse locking rods, the outer end points of those two locking rods are aligned with the locating holes on the two sides of the frame.

14. The child carrier of claim 13, wherein both said swing arms are hinged on a cross beam of the frame.

15. The child carrier of claim 1, wherein said locking device comprises an anti-swing latch comprising a first end fixed to said frame and a second end spaced apart from the first end and configured to engage said swinging unit to prevent said swinging unit and said seat from moving relative to said frame.

16. The child carrier of claim 15, wherein said first end of said anti-swing latch is pivotally connected to said frame.

17. The child carrier of claim 1, further comprising a means for coupling said seat to said swinging unit so that said seat is capable of being coupled to said frame and used in the child carrier and uncoupled from said frame and used as a stand alone seat.

18. The child carrier of claim 17, wherein the seat comprises a seat attachment pin and the coupling means comprises a seat-coupling bar linked to the frame and the seat-coupling bar is formed to include a slot having an open end configured to receive the seat attachment pin.

19. The child carrier of claim 18, wherein the coupling means further comprises a seat-locking device coupled to the seat-coupling bar, the seat-locking device comprises a pin-retaining device configured to move between a seat-locking position blocking the open end of the slot and a seat-unlocking position opening the open end of the slot and means for moving the pin-retaining device so that the seat can be removed from the seat-coupling bar by moving the pin-retaining device from the seat-locking position to the seat-unlocking position.

20. The child carrier of claim 19, wherein the seat-unlocking device further includes a spring biasing the pin-retaining device toward the seat-locking position.

21. The child carrier of claim 17, wherein the seat comprises two seat attachment pins spaced apart from each other, said coupling means comprises a seat-coupling bar comprising two slots spaced apart from each other and each having an open end configured to receive either one of said seat attachment pins, and said two slots are configured to receive said two attachment pins at the same time in either forward or backward orientation so that the seat may be coupled to the frame in either a forward-facing orientation or a rearward-facing orientation.

22. The child carrier of claim 17, wherein the seat includes two seat attachment pins on the left side and two seat attachment pins on the right side, the coupling means includes two seat-coupling bars installed transversly along the frame and spaced apart from each other, each seat-coupling bar comprises two slots each having an open end configured to receive either of the two seat attachment pins and said two slots are configured to receive said two attachment pins on one side of the seat at the same time.

23. The child carrier of claim 22, wherein the coupling means further includes a seat-locking device connected to one of the seat-coupling bars; the seat-locking device includes a pin-retaining device configured to move between a seat-locking position blocking the open end of a slot on one of said seat-coupling bars and a seat-unlocking position opening the open end of said slot and means for actuating the locking device so that the seat can be removed from the seat-coupling bar by moving the locking device from the locked position to the unlocked position.

24. The child carrier of claim 23, wherein the seat-locking device is connected to the seat-coupling bars.

25. The child carrier of claim 22, wherein the two slots on each of the two seat-coupling bars are configured to receive the two seat attachment pins on both the left side and the right side of the seat so that the seat may be coupled to the frame in either a forward-facing orientation or a rearward-facing orientation.

26. A child carrier comprising a frame, wheels disposed at the lower portion of said frame, a handbar joined to said frame for manually pushing said frame, a seat unit coupled to the frame, swinging means for permitting the seat unit to move in a swinging motion relative to the frame, and means for fixing the position of the seat unit relative to the frame to prevent the seat unit from moving relative to the frame.

27. The child carrier of claim 26, wherein the fixing means includes an anti-swing latch having a first end fixed to the frame and a second end spaced apart from the first end and configured to engage the swinging means to prevent the seat from moving relative to the frame.

28. The child carrier of claim 27, wherein the first end of the anti-swing latch is pivotably coupled to the frame.

* * * * *